(12) United States Patent
Inata et al.

(10) Patent No.: US 6,697,321 B2
(45) Date of Patent: Feb. 24, 2004

(54) DISC APPARATUS

(75) Inventors: Masahiro Inata, Itami (JP); Teruyuki Takizawa, Neyagawa (JP); Yoshito Saji, Nishinomiya (JP); Yukio Nishino, Nara (JP)

(73) Assignee: Matsushita Electric Industrial Co., LTD, Osaka (JP)

(*) Notice: Subject to any disclaimer, the term of this patent is extended or adjusted under 35 U.S.C. 154(b) by 197 days.

(21) Appl. No.: 09/952,019

(22) Filed: Sep. 11, 2001

(65) Prior Publication Data

US 2002/0044522 A1 Apr. 18, 2002

(30) Foreign Application Priority Data

Sep. 21, 2000 (JP) .......................................... 2000-286710
Mar. 21, 2001 (JP) ............................................ 2001-79941

(51) Int. Cl.[7] ............................................. G11B 25/04
(52) U.S. Cl. ...................................... 369/271; 369/270
(58) Field of Search ............................... 369/264–271, 369/77.1

(56) References Cited

U.S. PATENT DOCUMENTS 5,808,996 A * 9/1998 Aoyama .................... 369/75.1

FOREIGN PATENT DOCUMENTS

| JP | 58155585 A | * | 9/1983 | ......... G11B/25/04 |
| JP | 62008358 A | * | 1/1987 | ......... G11B/17/028 |
| JP | 5-298798 | | 11/1993 | |
| JP | 6-349177 | | 12/1994 | |
| JP | 08279231 A | * | 10/1996 | ......... G11B/17/30 |
| JP | 09035385 A | * | 2/1997 | ......... G11B/17/04 |
| JP | 9-320158 | | 12/1997 | |
| JP | 9-326148 | | 12/1997 | |
| JP | 10199127 A | * | 7/1998 | ......... G11B/19/20 |
| JP | 2000222800 A | * | 8/2000 | ......... G11B/17/028 |
| JP | 2000235754 A | * | 8/2000 | ......... G11B/17/028 |
| JP | 2000-306304 | | 11/2000 | |

OTHER PUBLICATIONS

Office Action dated Oct. 23, 2002 regarding corresponding Japanese Application No. 2001-274344.

* cited by examiner

Primary Examiner—William Klimowicz
(74) Attorney, Agent, or Firm—Renner, Otto, Boisselle & Sklar, LLP

(57) ABSTRACT

A disc apparatus includes a turntable having surface on which a disc is to be placed and being rotatable around a rotation axis; a disc holding mechanism which can be in a first state of holding the disc on the turntable so as to be rotatable around the rotation axis and a second state which is different from the first state; a first contact member; and a moving mechanism for relatively moving the first contact member and the turntable with respect to each other.

22 Claims, 18 Drawing Sheets

DISC APPARATUS

BACKGROUND OF THE INVENTION

1. Field of the Invention

The present invention relates to a disc apparatus for recording and reproducing a disc-type recording medium such as, for example, a CD or a DVD, and in particular to a disc apparatus having a reduced thickness which is used as a peripheral device of a video apparatus for home use or a computer for automatically mounting or removing of a disc.

2. Description of the Related Art

Today, as computers are reduced in size and thickness, disc apparatuses such as, for example, CD-ROM drives, incorporated into the computers are also demanded to be reduced in size and thickness. In general, a disc apparatus for recording or reproducing a removable disc type recording medium such as, for example, a CD or a DVD, means for mounting or removing the disc on or from a turntable on which the disc is to be placed is required in order to exchange discs. For easier operation, a disc apparatus including means for automatically mounting or removing the disc without requiring manual operation of the user is demanded.

Conventionally, the automatic mounting and removing of the disc is performed as follows. After the disc is transported by a transportation mechanism, the disc is mounted or removed by holding the disc with a turntable below the disc and a clamper on the disc. The clamper is a clamping member for holding the disc.

A disc apparatus having such a function is disclosed by Japanese Laid-Open Publication No. 10-116458. The disc apparatus described in this publication performs as follows. A disc is transported to a turntable by a loading mechanism, and placed on the turntable. Then, a clamping member including a magnetic body presses the disc on the turntable from above the disc using a magnetic force of the clamping member. Against the magnetic force, the clamping member or the turntable is separated from the disc. Thus, the disc is removed.

Japanese Laid-Open Publication No. 11-31350 describes a disc apparatus, which removes a disc as follows. The disc is transported to a turntable by a loading mechanism, and placed on the turntable. Then, a clamping member is pressed on the disc by an elastic force of a spring from above the disc, thereby holding the disc on the turntable. The clamping member or the turntable is separated from the disc in such a direction to remove the elastic force, thereby removing the disc.

However, the above-described conventional disc apparatuses include a clamping (clamper) having a certain thickness which is provided on a top surface of the disc for automatically mounting or removing the disc. Therefore, it is difficult to reduce the thickness of the disc apparatus.

SUMMARY OF THE INVENTION

According to one aspect of the invention, a disc apparatus includes a turntable having a surface on which a disc is to be placed and being rotatable around a rotation axis; a disc holding mechanism which can be in a first state of holding the disc on the turntable so as to be rotatable around the rotation axis and a second state which is different from the first state; a first contact member, and a moving mechanism for relatively moving the first contact member and the turntable with respect to each other. When the disc holding mechanism is in the second state the moving mechanism relatively moves the turntable with respect to the first contact member so that the first contact member contacts the disc; and when the first contact member contacts the disc, the moving mechanism operates so that the first contact member applies a force on the disc in a direction of pressing the disc toward the turntable, thus placing the disc holding mechanism in the second state into the first state.

In one embodiment of the invention, first contact member is at a fixed position, and the moving mechanism raises and lowers the turntable so as to relatively move the turntable with respect to the first contact member.

In one embodiment of the invention, the moving mechanism relatively moves the turntable with respect to the first contact member so that the disc holding mechanism is in the second state at time $t_1$, the disc holding mechanism is changed from the second state into the first state at time $t_4$ after time $t_1$, and the disc holding mechanism is in the first state at time $t_5$ after time $t_4$.

In one embodiment of the invention, the disc includes an inner area, and the first contact member contacts the inner area of the disc.

In one embodiment of the invention, the disc apparatus further includes an outer casing. The first contact member is a projection provided on a portion of the outer casing.

In one embodiment of the invention, the projection is ring-shaped.

In one embodiment of the invention, the first contact member is a projection provided on a portion of an information device accommodating the disc apparatus.

In one embodiment of the invention, the projection is ring-shaped.

In one embodiment of the invention, the inner area is a non-recording area.

In one embodiment of the invention, the disc apparatus further includes a raising and lowering base for supporting the turntable via an elastic member interposed therebetween, the moving mechanism raises and lowers the turntable by raising and lowering the raising and lowering base.

In one embodiment of the invention, the elastic body acts as a vibration alleviating member for alleviating a vibration of the disc apparatus.

In one embodiment of the invention, when the first contact member contacts the disc, the turntable is substantially parallel to the first contact member.

In one embodiment of the invention, when the first contact member contacts the disc, the turntable is at a prescribed angle with respect to the first contact member.

According to another aspect of the invention, a disc apparatus includes a turntable having a surface on which a disc is to be placed and being rotatable around a rotation axis; a disc holding mechanism which can be in a first state of holding the disc on the turntable no au to be rotatable around the rotation axis and a second state which is different from the first state; a second contact member; and a moving mechanism for relatively moving the second contact member and the turntable with respect to each other. When the disc holding mechanism is in the first state, the moving mechanism relatively moves the turntable with respect to the second contact member so that the second contact member contacts the disc; and when the second contact member contacts the disc, the moving mechanism operates so that the second contact member applies a force on the disc in a direction of separating the disc away from the turntable, thus placing the disc holding mechanism in the first state into the second state.

In one embodiment of the invention, the second contact member is at a fixed position, and the moving mechanism raises and lowers the turntable so as to relatively move the turntable with respect to the second contact member.

In one embodiment of the invention, the moving mechanism relatively moves the turntable with respect to the second contact member so that the disc holding mechanism is in the first state at time $t_7$, the disc holding mechanism is changed from the first state into the second state at time $t_8$ after time $t_7$, and the disc holding mechanism is in the second state at time $t_9$ after time $t_8$.

In one embodiment of the invention, the disc includes an inner area and an outer area, which are both non-recording areas, and the second contact member contacts one of the inner area and the outer area of the disc.

In one embodiment of the invention, the disc apparatus further includes an outer casing. The second contact member is a projection provided on a portion of the outer casing.

In one embodiment of the invention, the disc apparatus further includes a raising and lowering base for supporting the turntable via an elastic member interposed therebetween. The moving mechanism raises and lowers the turntable by raising and lowering the raising and lowering base.

In one embodiment of the invention, the elastic body acts as a vibration alleviating member for alleviating a vibration of the disc apparatus.

In one embodiment of the invention, the disc apparatus further includes at least another second contact member. The disc holding mechanism includes a plurality holding claws, and when the at least two second contact members contact the disc, the plurality of holding claws are provided around the rotation axis at an angle, which is different from the angle at which the at least two second contact members are provided around the rotation axis.

In one embodiment of the invention, the plurality of holding claws are provided equidistantly on a circle having the rotation axis an the center.

A disc apparatus according to the present invention automatically mounts or removes a disc without using a clamper provided on the top surface of the disc for holding the disc together with the turntable below the disc.

Therefore, the number of components can be reduced and the thickness of the disc apparatus can be reduced by the thickness of the clamper.

Thus, the invention described herein makes possible the advantages of providing a compact and thin disc apparatus having an automatic disc mounting and removing mechanism without requiring a clamping member or a clamper on a top surface of a disc.

These and other advantages of the present invention will become apparent to those skilled in the art upon reading and understanding the following detailed description with reference to the accompanying figures.

DESCRIPTION OF THE EMBODIMENTS

Hereinafter, the present invention will be described by way of illustrative examples with reference to the accompanying drawings.

EXAMPLE 1

Figure 1:
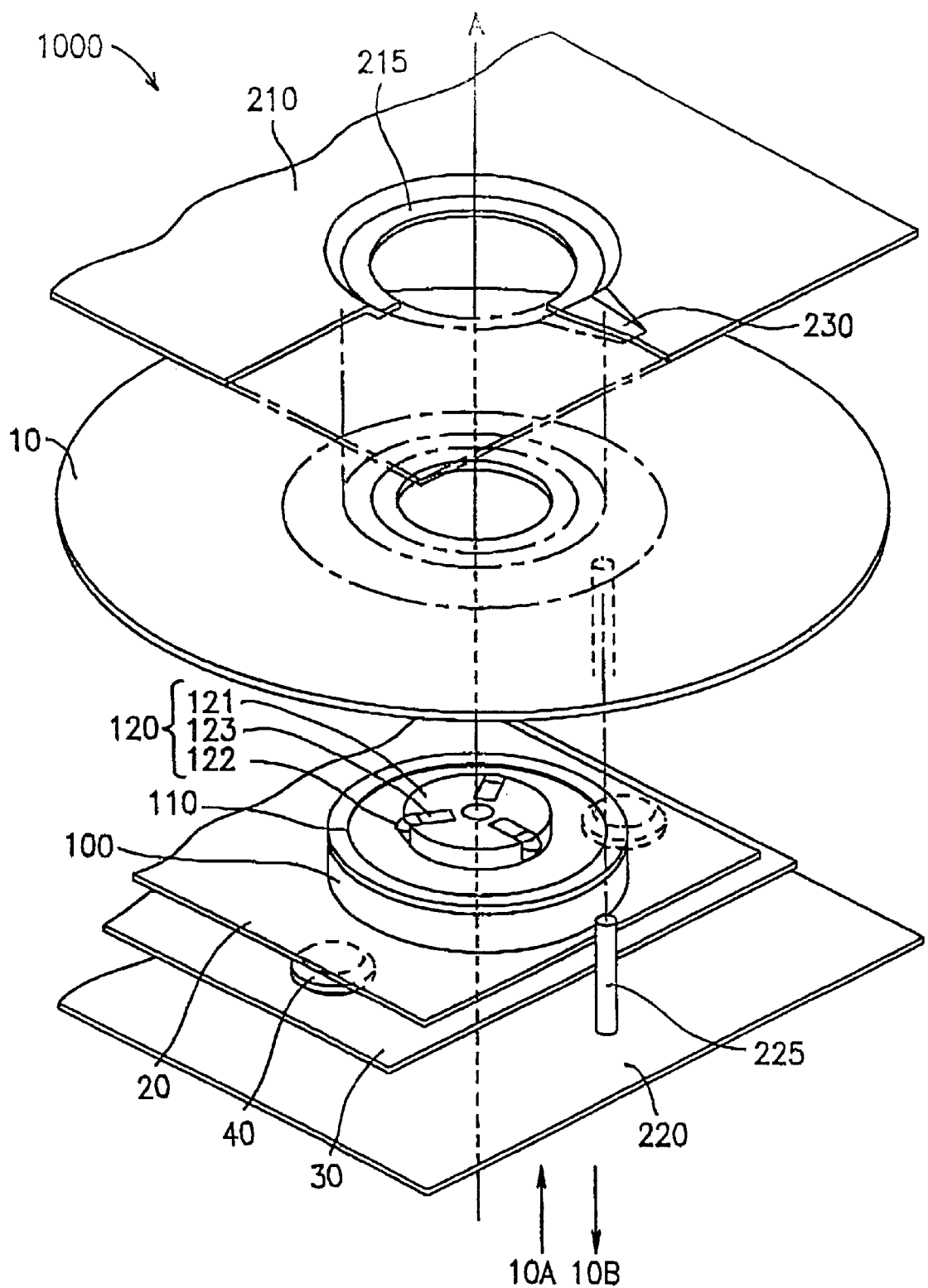
FIG. 1 is an exploded isometric view illustrating a structure of a disc apparatus according to a first example of the present invention.

FIG. 1 is an exploded isometric view illustrating a structure of a disc apparatus 1000 according to a first example of the present invention.

The disc apparatus 1000 includes a turntable 110, a disc holding mechanism 120 provided on the turntable 110, a first contact member 215 used for mounting a disc 10 (disc engaging member 215), and a second contact member 225 used for removing the disc 10 (disc removing member 225).

The turntable 110 has a surface on which the disc 10 is to be placed and is rotatable around a rotation axis A.

Figure 2A:
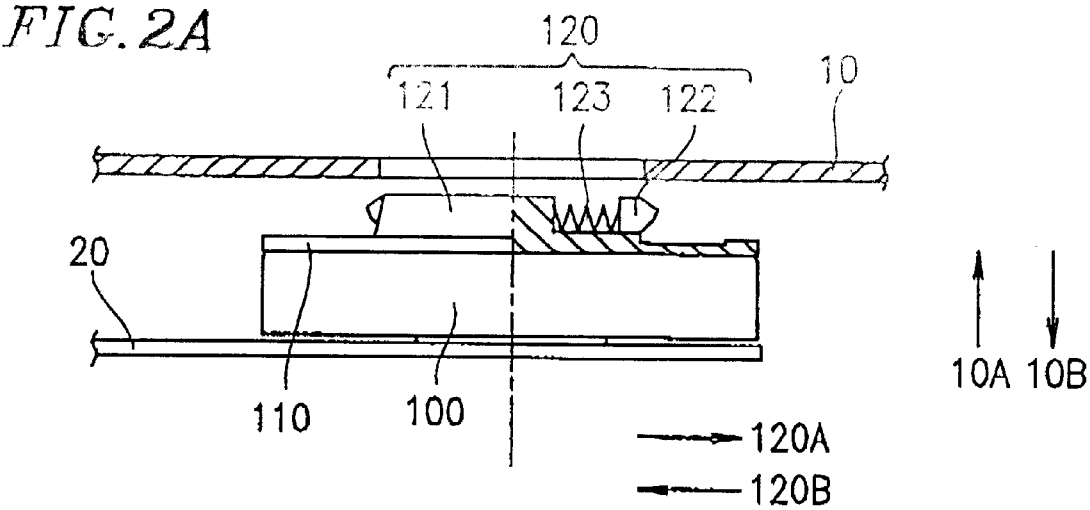
FIGS. 2A, 2B and 2C show an operation of a disc holding mechanism of the disc apparatus shown in FIG. 1.
Figure 2B:
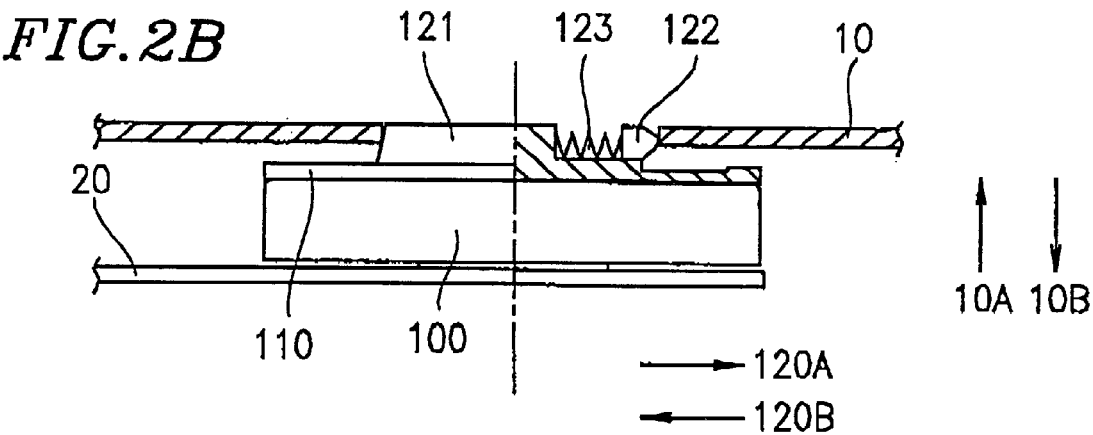

The disc holding mechanism 120 includes a hub 121, holding claws 122 and an elastic member 123 for loading each holding claw 122. The disc holding mechanism 120 can be in a first state of holding the disc 10 on the turntable 110 so as to be rotatable around the rotation axis A, and a second state which is different from the first state. The second state is shown in FIGS. 2A and 2B and will be described later. The hub 121 is engageable with a central hole of the disc 10. The disc 10 in held on the turntable 110 by the holding claws 122 and the elastic members 123.

In the first example, the first contact member 215 is a ring-shaped projection provided on a portion of an upper casing 210, which is a portion of an outer casing of the disc apparatus 1000. The first contact member 215 is contactable with an inner non-recording area of the disc 10. The first contact member 215 is connected to a slope 230 for guiding the disc 10 to the disc holding mechanism 120. Due to the slope 230, disc transfer means member (not shown) smoothly guides the disc 10 to an appropriate position above the turntable 110. The first contact member 215 it not limited to such a form but can be of any form which is contactable with the inner non-recording area of the disc 10.

In the first example, the second contact member 225 is a rod-like projection provided on a lower casing 220, which is a portion of the outer casing of the disc apparatus 1000. The second contact member 225 is contactable with the inner non-recording area or an outer non-recording area of the disc 10. The second contact member 225 is not limited to such a form but can be of any form which is contactable with the inner non-recording area or the outer non-recording area of the disc 10. A plurality of second contact members 225 can be provided.

The disc apparatus 1000 further includes a moving mechanism 300 (shown in FIGS. 3 through 7, 9 and 10) for relatively moving the turntable 110 and the first contact member 215 or the second contact member 225 with respect to each other. The moving mechanism 300 can move the turntable 110, the first contact member 215 or the second contact member 225, or both of the turntable 110 and the first contact member 215 or the second contact member 225. The moving mechanism 300 is preferably a raising and lowering section for raising or lowering the turntable 110. The moving mechanism 300 operates as follows.

When the disc holding mechanism 120 is in the second state, the moving mechanism 300 relatively moves the turntable 110 with respect to the first contact member 215 so that the first contact member 215 contacts the disc 10. After the first contact member 215 contacts the disc 10, the moving mechanism 300 still relatively moves the turntable 110 with respect to the first contact member 215. Thus, the first contact member 215 pressing the disc 10 toward the turntable 110. In this manner, the disc holding mechanism 120 is changed from the second state to the first state.

When the disc holding mechanism 120 is in the first state, the moving mechanism 300 relatively moves the turntable 110 with respect to the second contact member 225 so that the second contact member 225 contacts the disc 10. After the second contact member 225 contacts the disc 10, the moving mechanism 300 still relatively moves the turntable 110 with respect to the second contact member 225. Thus, the second contact member 225 pushes the disc 10 away from the turntable 110. In this manner, the disc holding mechanism 120 is changed from the first state to the second state.

As shown in FIG. 1, the disc apparatus 1000 further includes a spindle motor 100 for rotating the turntable 110 having the disc holding mechanism 120 thereon, a spindle motor supporting plate 20 for supporting the spindle motor 100, a raising and lowering base 30 for supporting the turntable 110, and vibration alleviating members 40 (elastic bodies) for supporting the spindle motor supporting plate 20. The vibration alleviating members 40 are formed of an elastic material such as, for example, rubber. The raising and lowering base 30 is raised in the direction of arrow 10A and lowered in the direction of arrow 10B by the moving mechanism 300 in order to raise and lower the turntable 110.

Figure 2C:
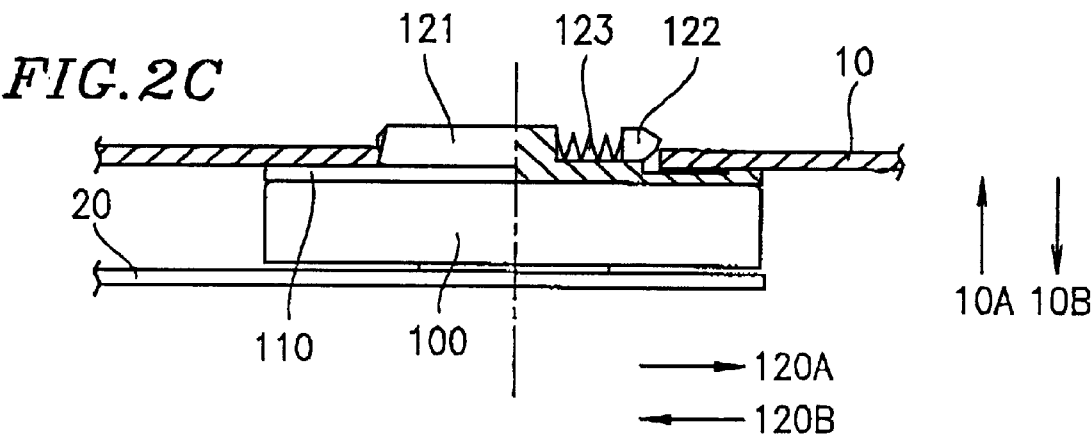

FIGS. 2A through 2C show an operation of the disc holding mechanism 120 in the disc apparatus 1000 shown in FIG. 1.

FIG. 2A shows a state of the disc holding mechanism 120 before the disc 10 is mounted on the turntable 110 or immediately after the disc 10 is removed from the turntable 110.

FIG. 2B shows a state of the disc holding mechanism 120 in the middle of the operation of mounting the disc 10 on or removing the disc 10 from the turntable 110.

FIG. 2C shows a state of the disc holding mechanism 120 where the disc 10 has been mounted on the turntable 110.

The first state refers to the state shown in FIG. 2C, and the second state refers to the state shown in FIG. 2A and FIG. 2B.

As described above (with reference to FIG. 1), the disc holding mechanism 120 includes the hub 121, the holding claws 122 and the elastic members 123. The hub 121 is engageable with the central hole of the disc 10 for guiding the disc 10. Each holding claw 122 is movable in the direction of projecting from an outer circumferential surface of the hub 121 (indicated with arrow 120A) and in the direction of returning toward the outer circumferential surface of the hub 121 (indicated with arrow 120B). Each holding claw 122 is connected to the elastic member 123 When the holding claw 122 engages the central hole of the disc 10 which is guided by the hub 121, the elastic member 123 loads the holding claw 122 in the direction of arrow 120A, thereby pressing the disc 10 on the turntable 110.

The operation of the disc holding mechanism 120 for mounting or removing the disc 10 on or from the turntable 110 will be described in detail. Although one holding claw 122 and one elastic member 123 will be described in the following description for the sake of simplicity, the other holding claws 122 and the other elastic members 123 operate in the same manner.

As shown in FIG. 2A, the disc 10 positioned above the turntable 110 is pushed in the direction of arrow 10B. When the central hole of the disc 10 is engaged with the and guided by the hub 121, the elastic member 123 is compressed so as to retract the holding claw 122 in the direction of arrow 120B. Thus, as shown in FIG. 2B, the disc 10 passes by the holding claw 122. When the disc 10 is further pushed in the direction of arrow 10B from the state shown in FIG. 2B, the elastic member 123 is released from the compresses state, thereby projecting the holding claw 122 in the direction of arrow 120A and engages the central hole of the disc 10. Then, as shown in FIG. 2C, the disc 10 is pressed on the turntable 110 by a loading force of the elastic member 123. Thus, the disc 10 is completely mounted on the turntable 110.

The disc 10 is removed from the turntable 110 by performing the opposite operation as follows. When the disc 10 in the state of FIG. 2C is pushed up in the direction of arrow 10A, the disc 10 is moved to the state of FIG. 2B and then to the state of FIG. 2A. Thus, the disc 10 is released from the disc holding mechanism 120 and removed from the turntable 110.

Figure 3:
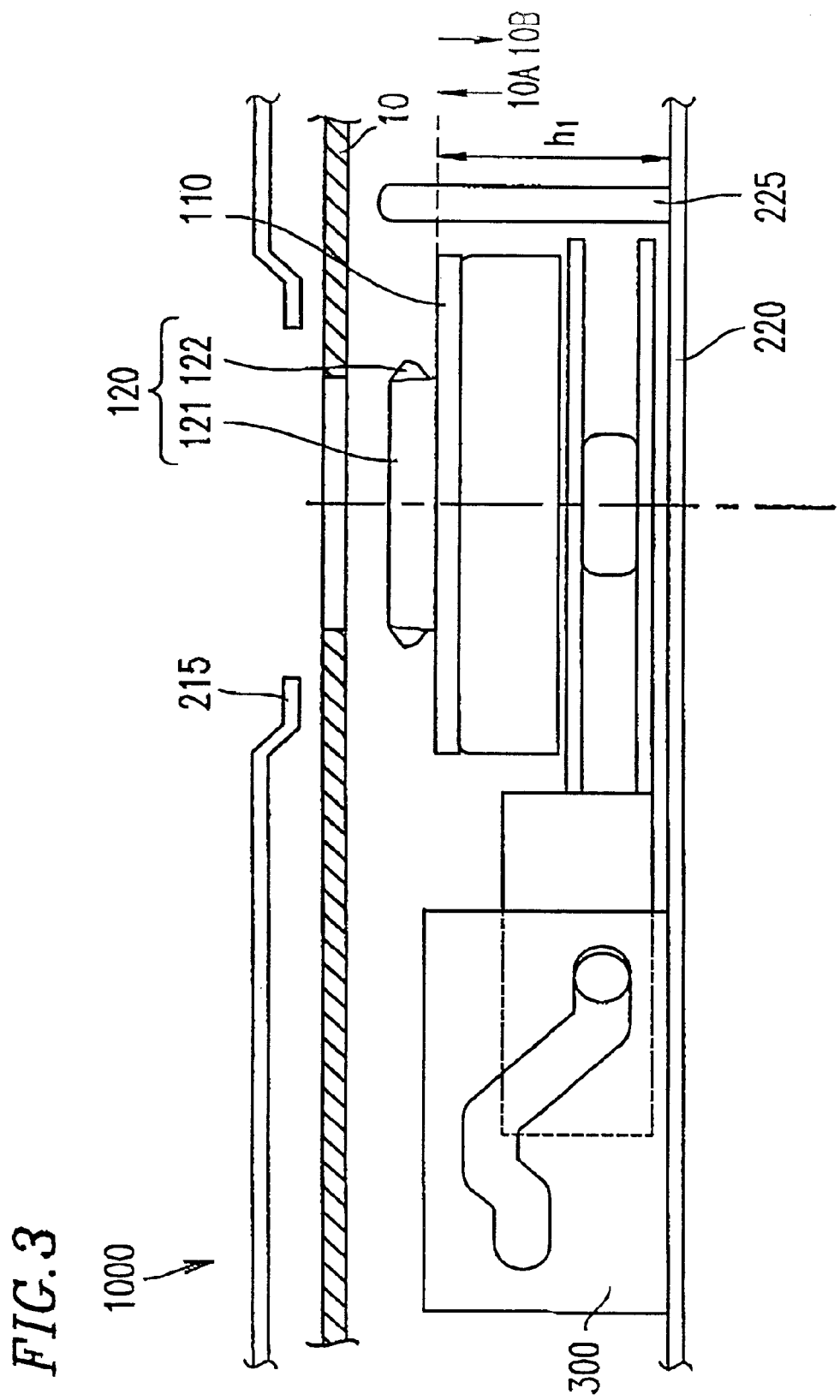
FIG. 3 shows a state of the disc apparatus shown in FIG. 1 before the disc in mounted on a turntable.
Figure 4:
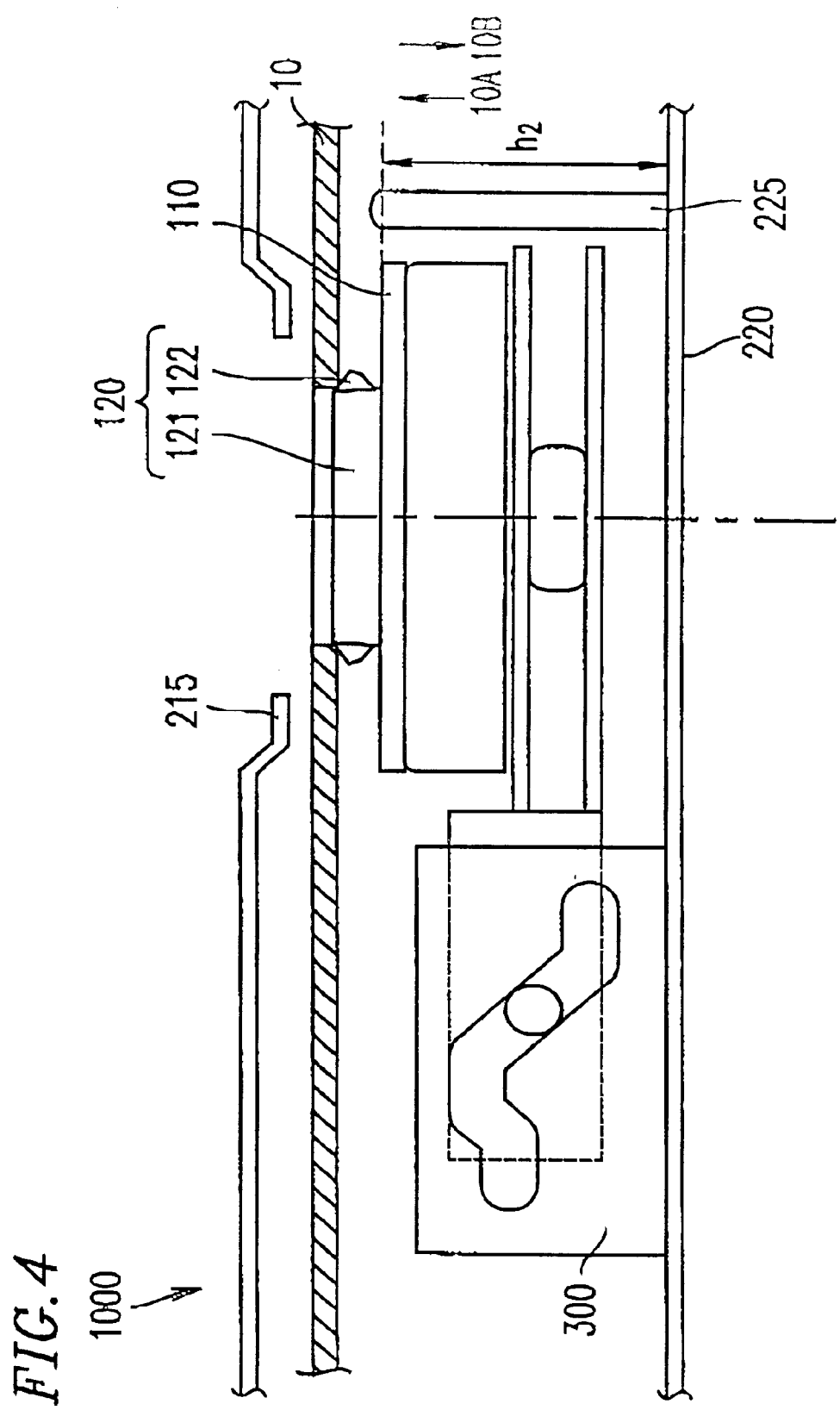
FIG. 4 shows a state of the disc apparatus shown in FIG. 1 in the middle of the operation of mounting the disc on the turntable.
Figure 5:
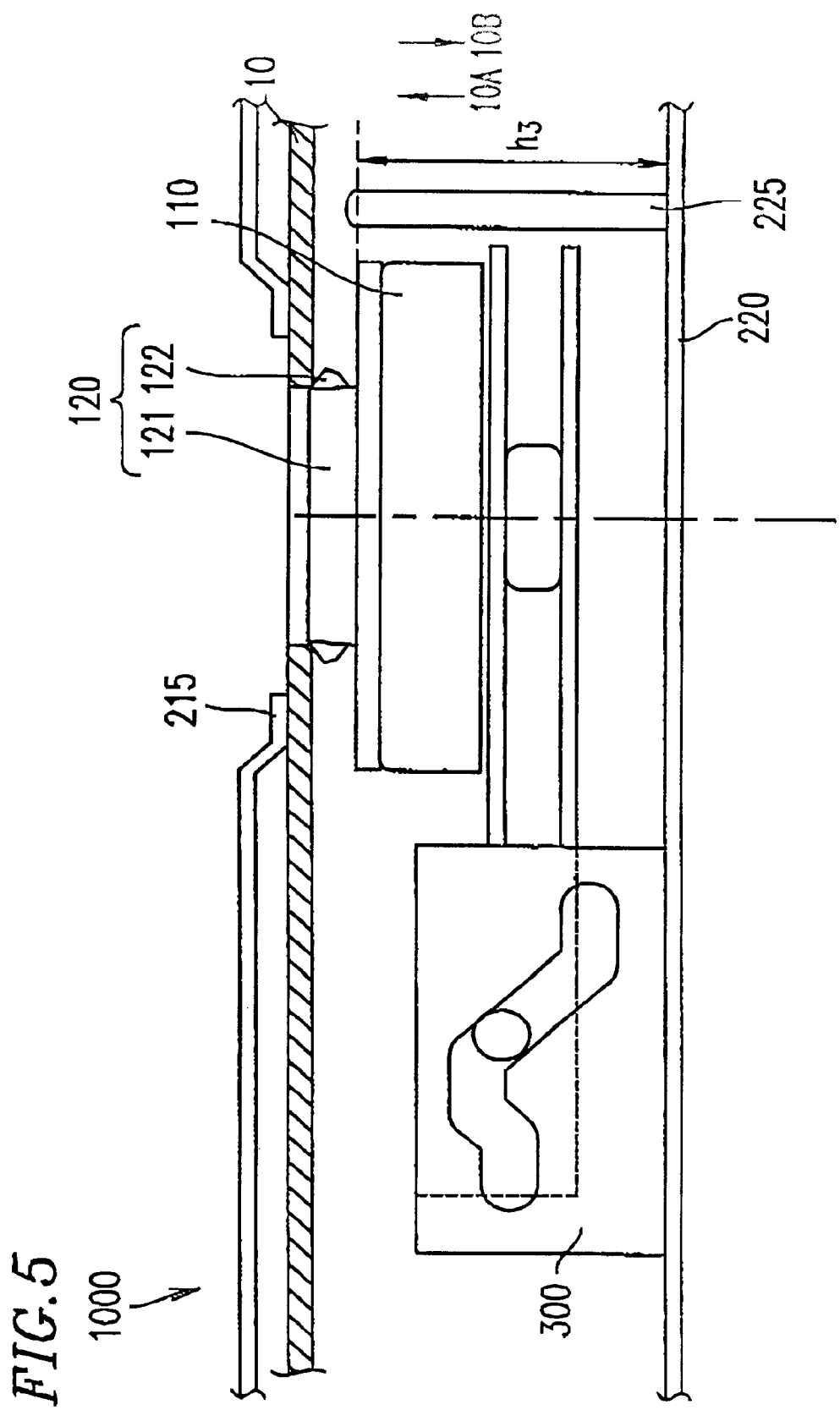
FIG. 5 shows a state of the disc apparatus shown in FIG. 1 in the middle of the operation of mounting the disc on the turntable, in which the disc contacts a first contact member.
Figure 6:
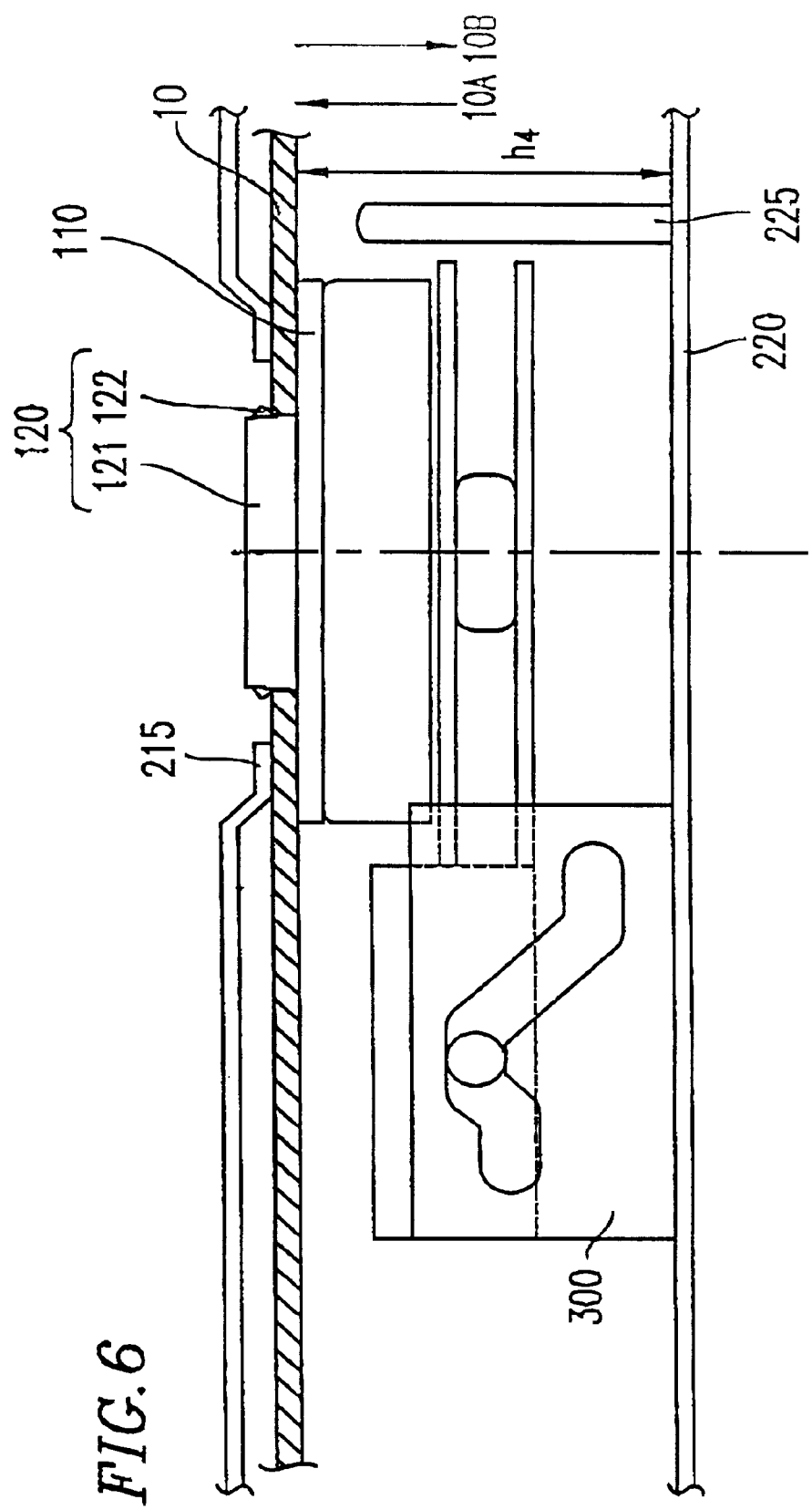
FIG. 6 shows a state of the disc apparatus shown in FIG. 1 where the disc has been mounted on the turntable
Figure 7:
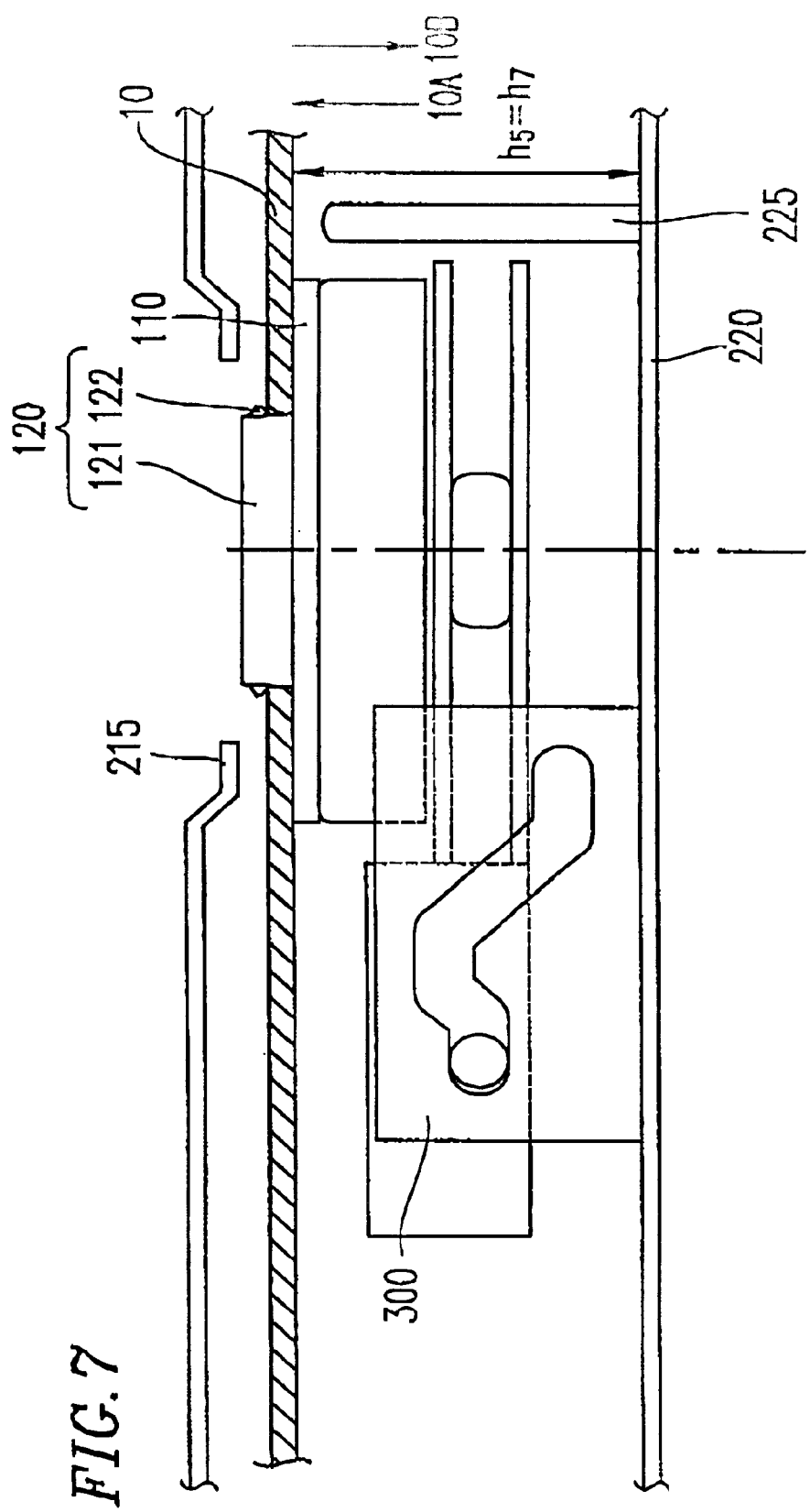
FIG. 7 shows a state of the disc apparatus shown in FIG. 1 where the disc has been mounted on the turntable, in which the disc is rotatable.
Figure 8:
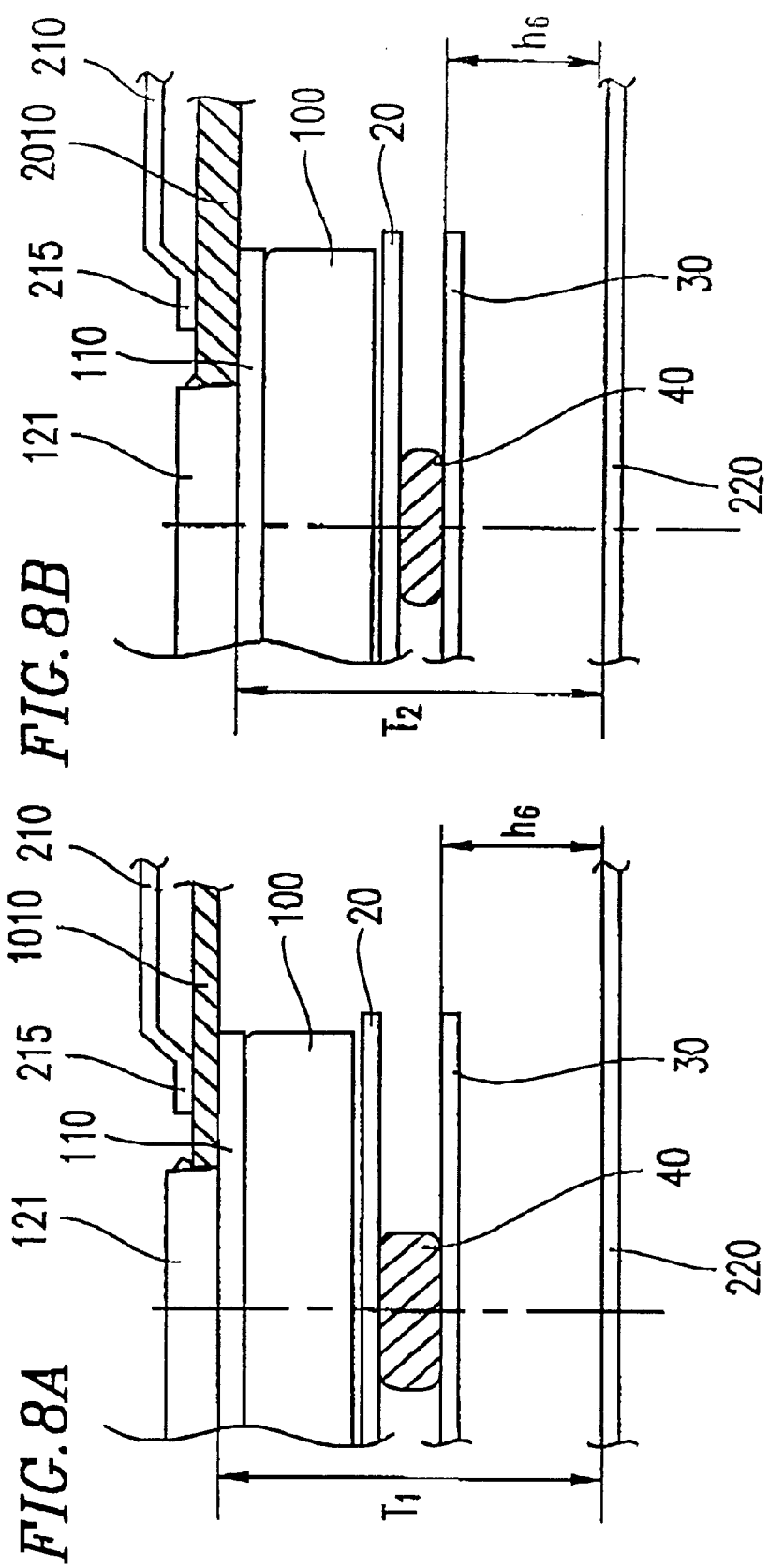
FIGS. 8A and 8B show states of the disc apparatus shown in FIG. 1 in which disc having different thicknesses contact the first contact member.

With reference to FIGS. 3 through 7, 8A and 8B, an operation of the disc apparatus 1000 for mounting the disc 10 on the turntable 110 will be described. FIG. 3 shows a state before the disc 10 is mounted on the turntable 110. FIG. 4 shows a state in the middle of the operation of mounting the disc 10 on the turntable 110. FIG. 5 shows a state in the middle of the operation of mounting the disc 10 on the turntable 110, in which the disc 10 contacts the first contact member 215. FIG. 6 shows a state where the disc 10 has been mounted on the turntable 110. FIG. 7 shows a state where the disc 10 has been mounted on the turntable 110, in which the disc 10 is rotatable. FIGS. 8A and 8B show states in which disc 1010 and 2010 having different thicknesses contact the first contact member 215.

Referring to FIG. 3, the disc 10 is positioned above the turntable 110 after being transported by the disc transfer means (not shown). At this point, the central line of the central hole of the disc 10 substantially matches the central line of the hub 121. The time at this point is defined as $t_1$, and the height from a top surface of the turntable 110 to the lower casing 220 is defined as $h_1$. The turntable 110 is raised in the direction of arrow 10A by the moving mechanism 300. Then, as shown in FIG. 4, the disc holding claw 122 of the disc holding mechanism 120 contacts a bottom surface of the disc 10. The time at this point is defined as $t_2$, and the height from the top surface of the turntable 110 to the lower casing 220 is defined as $h_2$.

As the turntable 110 is further raised, the disc 10 is raised while being contact with the holding claw 122. Then, as shown in FIG. 5, a top surface of the disc 10 contacts the first contact member 215. The time at this point is defined as $t_3$, and the height from the top surface of the turntable 110 to the lower casing 220 is defined as $h_3$. The turntable 110 is further raised. Although the disc 10 is prevented from moving further upward in the direction of arrow 10A by the first contact member 215, the turntable 110 is further raised since the disc holding mechanism 120 passes through the central hole of the disc 10. While the turntable 110 is raised, the first contact member 215 keeps on pressing the disc 10 on the turntable 110. Then, as shown in FIG. 6, the holding claw 122 of the disc holding mechanism 120 loaded by the elastic member 123 engages the central hole of the disc 10. Thus, the disc 10 is completely mounted on the turntable 110. The time at this point is defined as $t_4$, and the height from the top surface of the turntable 110 to the lower casing 220 is defined as $h_4$.

When the disc 10 is completely mounted on the turntable 110, the turntable 110 is lowered by the moving mechanism 300 to a position at which the turntable 110 does not contact the first contact member 215 or the second contact member 225. Thus, as shown in FIG. 7, the disc 10 held by the disc holding mechanism 120 is rotatable together with the turntable 110. The time at this point is defined as $t_5$, and the height from the top surface of the turntable 110 to the lower casing 220 is defined as $h_5$.

The disc apparatus 1000 can mount discs having different thicknesses on the turntable 10 with certainty by providing the vibration alleviating member 40 on the raising and lowering base 30 as shown in FIGS. 8A and 8B (operation from $t_1$ to $t_4$). The vibration alleviating member 40 is elastically deformable. FIG. 8A shows the state where a relatively thin disc 1010 having a thickness of about 1.1 mm contacts the first contact member 215. FIG. 8B shows the state where a relatively thick 2010 having a thickness of about 1.5 mm contacts the first contact member 215. As can be appreciated from FIGS. 8A and 8B, when discs having different thicknesses contact the first contact member 215, the heights from the bottom surface of the discs, i.e., the heights from the top surface of the turntable 110 to the lower casing 220 (T1 in FIG. 8A and T2 in FIG. 8B), are different.

In the first example, the spindle motor supporting plate 20 is supported by the raising and lowering base 30 via with the vibration alleviating member 40 interposed therebetween. The height from the top surface of the turntable 110 to the lower casing 220 can be changed by elastic deformation of the vibration alleviating member 40. Accordingly, discs can be mounted on the turntable 110 regardless of the thickness thereof by setting the raising the lowering base 30 at a uniform height from the lower casing ($h_4$).

In the case where there is a size dispersion other than in the thickness of the disc 10 (for example, a production error in the height of the disc apparatus 1000) the height from the top surface of the turntable 110 to the lower casing 220 can be changed by elastic deformation of the vibration alleviating member 40 in a similar manner. That is, the elastic deformation of the vibration alleviating member 40 absorbs the size dispersion in the thickness of discs or height of the disc apparatuses. Therefore, the disc can be pressed on and mounted on the turntable 110 with certainty. The vibration alleviating member 40 also alleviates the vibration of the disc apparatus 1000.

As described above, in the first example, the turntable 110 is raised and the disc 10 is pressed on the first contact member 215. In this manner, the disc 10 is mounted on the turntable 110.

Figure 9:
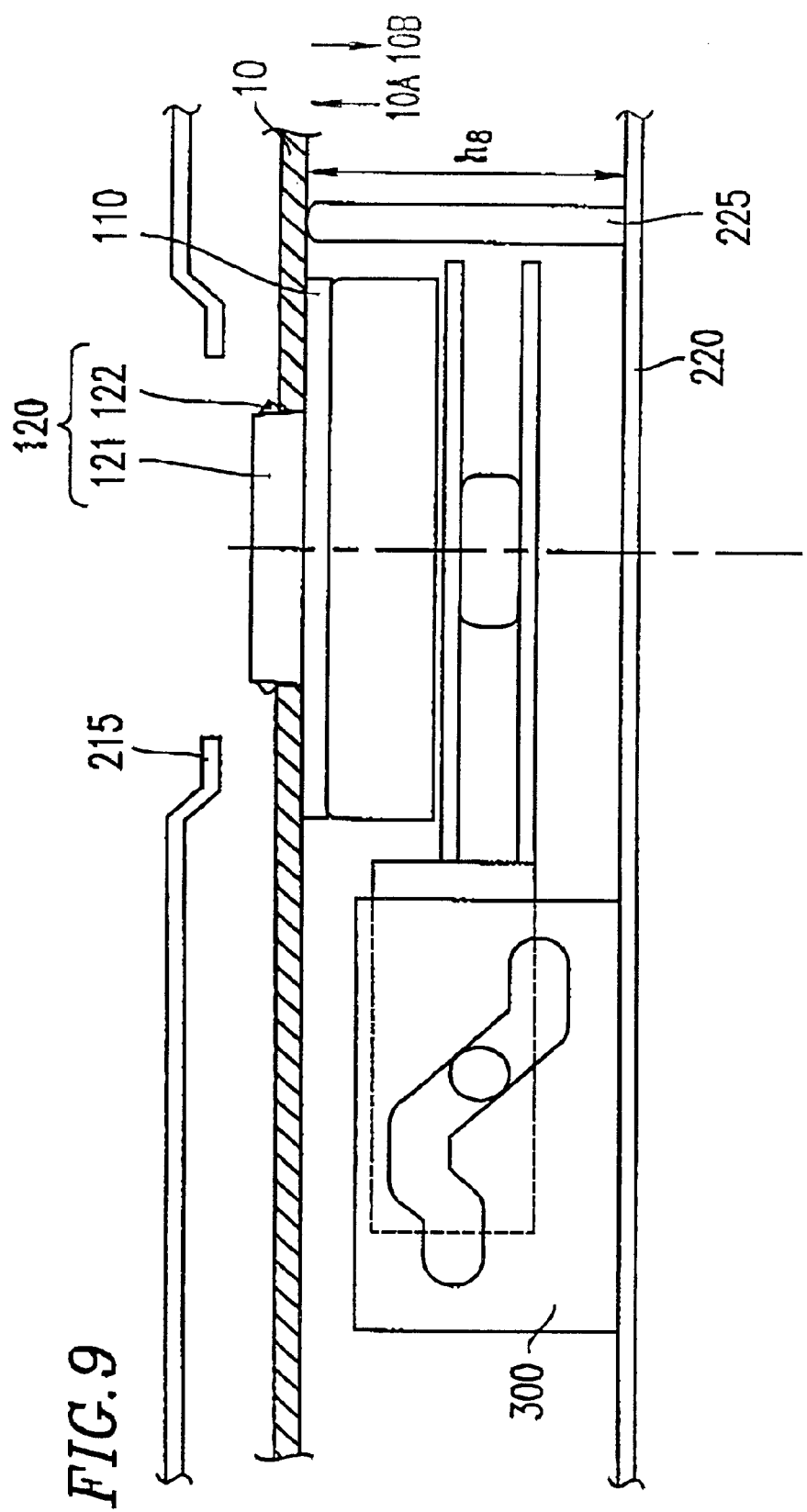
FIG. 9 show a state of the disc apparatus shown in FIG. 1 in the middle of the operation of removing the disc from the turntable.
Figure 10:
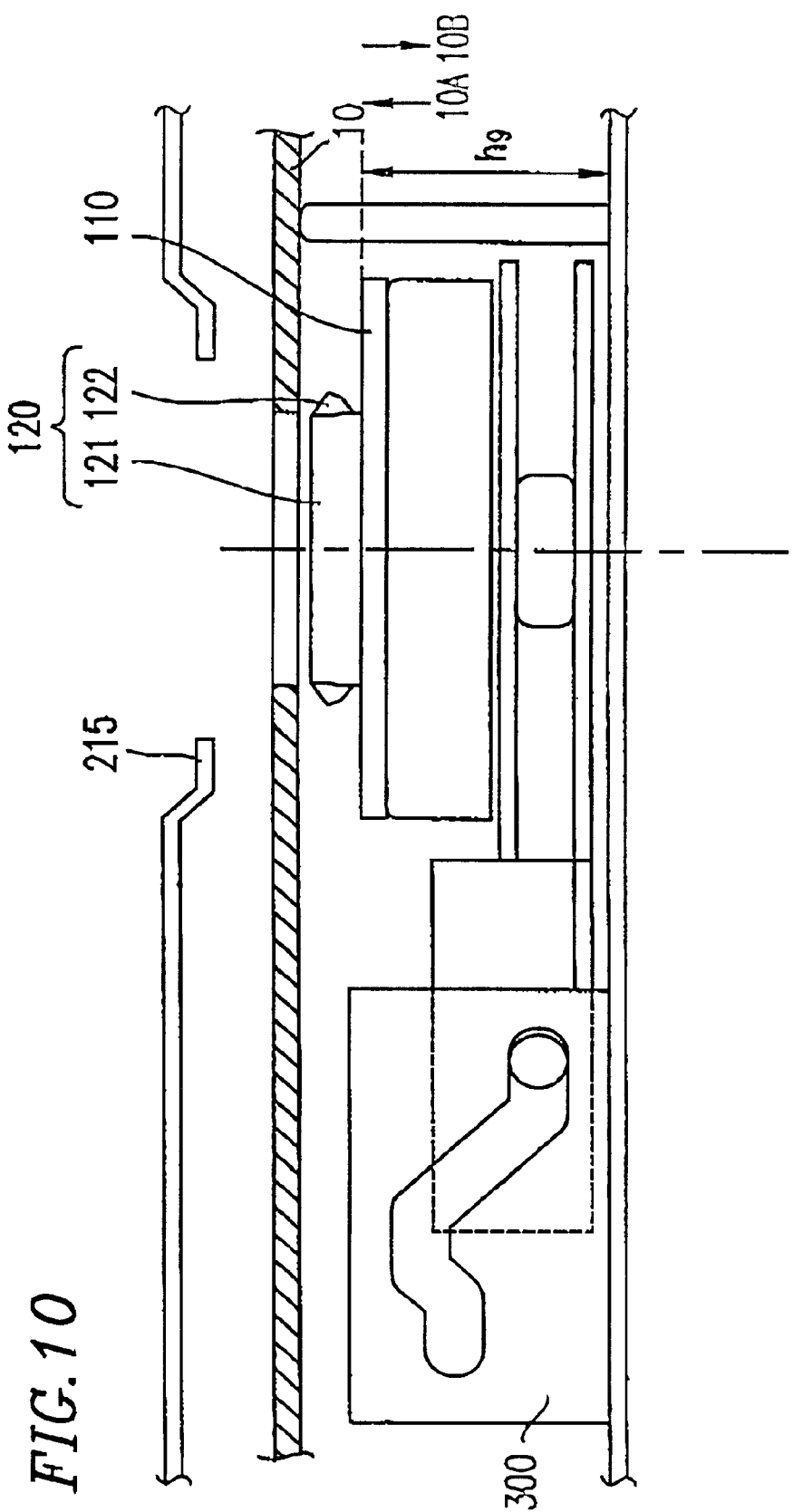
FIG. 10 shows a state of the disc apparatus shown in FIG. 1 where the disc has been removed from the turntable.

With reference to FIGS. 7, 9 and 10, an operation of the disc apparatus 1000 for removing the disc 10 from the turntable 1000 will be described.

FIG. 7 shows the state where the disc 10 has been mounted on the turntable 110, in which the disc 10 is rotatable, i.e., before the disc 10 is removed from the turntable 110. FIG. 9 show a state in the middle of the operation of removing the disc 10 from the turntable 110. FIG. 10 shows a state where the disc 10 has been removed from the turntable 110.

The disc 10 is removed from the turntable 110 by performing an operation opposite to the operation of mounting the disc 10 on the turntable 110.

At the start of the operation of removing the disc 10 from the turntable 110, as shown in FIG. 7, the disc 10 is rotatable together with the turntable 110 and is not in contact with the second contact member 225. The time at this point is defined as $t_7$, and the height from the top surface of the turntable 110 to the lower casing 220 is defined as $h_7$. The height $h_7$ is substantially the same as the height $h_5$. From this state, the turntable 110 is lowered in the direction of arrow 10B by the moving mechanism 300. Then, as shown in FIG. 9, the disc 10 contacts the second contact member 225. The time at this point is defined as $t_8$, and the height from the top surface of the turntable 110 to the lower casing 220 is defined as $h_8$.

As disc 10 is further lowered, the second contact member 225 relatively pushes the disc 10 away from the turntable 110. Then, as shown in FIG. 10, the holding claw 122 of the disc holding mechanism 120 is disengaged from the central hole of the disc 10. Thus, as shown in FIG. 10, the disc 10 is removed from the turntable 110. The time at this point is defined as $t_9$, and the height from the top surface of the turntable 110 to the lower casing 220 is defined as $h_9$.

Figure 18:
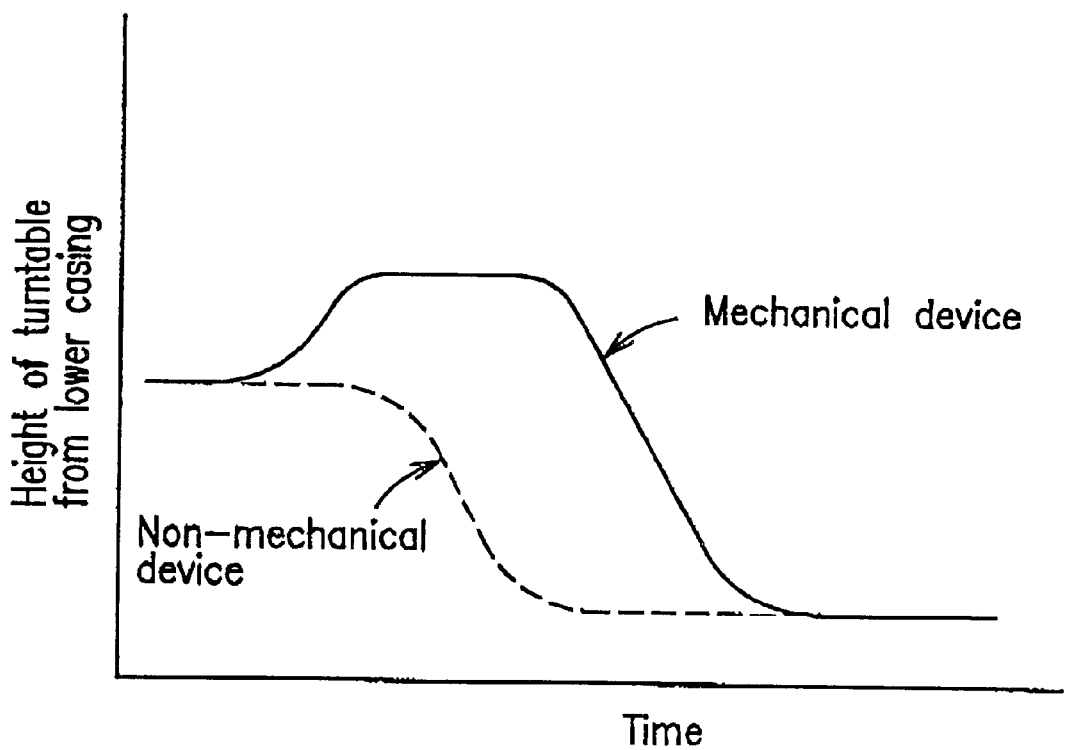
FIG. 18 is a graph illustrating an operation of raising and lowering the turntable performed by a mechanical device and a non-mechanical device.

In the operation of removing the disc 10 from the turntable 110, the turntable 110, moves in the exactly opposite manner to the operation of mounting the disc 10 on the turntable 110. Therefore, when the turntable 110 is lowered from the state of FIG. 7, the turntable 110 is temporarily raised so as to put the disc 10 in contact with the first contact member 215, and immediately thereafter, the turntable 110 is lowered. This temporarily rise of the turntable 110 does not influence the operation of removing the disc 10 from the turntable 110, but can be eliminated by using a non-mechanical device, for example, an electric device (e.g., a computer), instead of a mechanical device, for example, the moving mechanism 300. As opposed to the mechanical device for raising and lowering the turntable 300 using a profile of a groove as shown in FIGS. 3 through 7, 9 and 10, the non-mechanical device lowers the turntable 10 in the path shown by the dashed line in FIG. 18.

As described above, in the first example, the turntable 110 is lowered and the disc 10 is pressed on the second contact member 225. In this manner, the disc 10 is removed from the turntable 110.

Figure 11A:
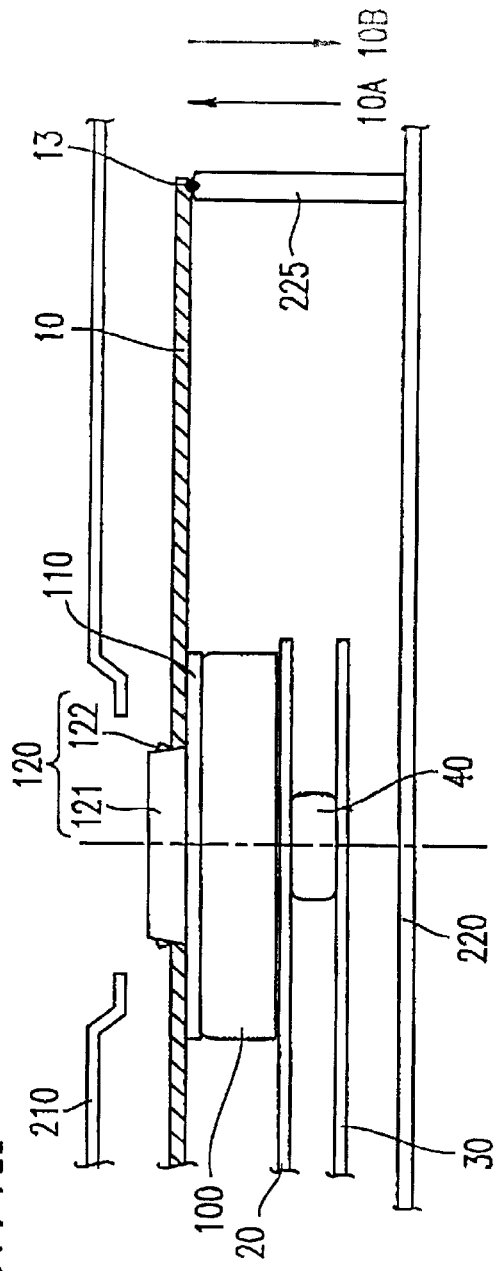
FIGS. 11A and 11B show the second contact member 225 of the disc apparatus shown in FIG. 1 provided so as to contact an outer non-recording area of the disc.
Figure 11B:
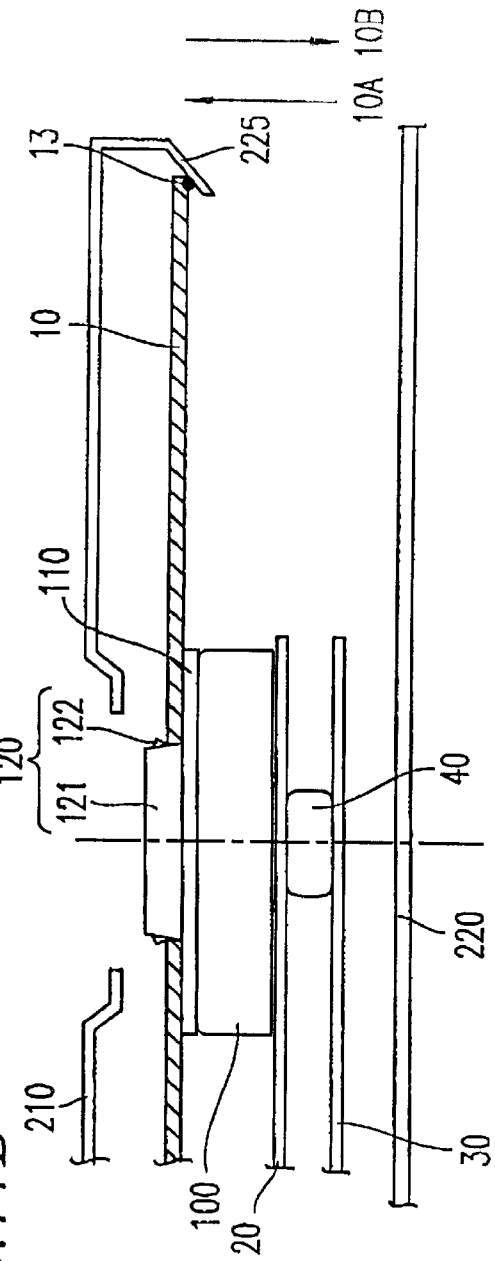

In the above description, the second contact member 225 is provided so as to contact the inner non-recording area of the disc 10. FIGS. 11A and 11B show the second contact member 225 provided so as to contact an outer non-recording area 13 of the disc 10. In FIG. 11A, the second contact member 225 is fixed on the lower casing 220. In FIG. 11B, a disc guide member for guiding the outer non-recording area 13 of the disc 10 also acts as the second contact member 225.

As shown in FIGS. 11A and 11B, even in the structure for putting the second contact member 225 into contact with the outer non-recording 13 area of the disc 10, the disc 10 is prevented from moving in the direction of arrow 10B by the second contact member 225. Therefore, when the turntable 110 is lowered from the position shown in FIGS. 11A and 11B, the disc 10 is relatively raised in the direction of arrow 10A by the second contact member 225. In the structure shown in FIGS. 11A and 11B, the disc holding mechanism 120 operates in a similar manner to the case where the second contact member 225 contacts the inner non-recording area of the disc 10, so as to remove the disc 10 from the turntable. The second contact member 225 also acting as the disc guide member for guiding the outer non-recording area 13 of the disc 10 can be a disc transfer means such as, for example, a pin or a tray.

In the first example, the first contact member 215 is provided on the upper casing 210, but is not limited to such a structure. The first contact member 215 can be a projection provided on a portion of an information device for accommodating the disc apparatus 1000, in which the first contact member 215 can operate in a manner similar to the above-described manner.

In the first example, the first contact member 215 is provided so as to be contactable with the inner non-recording area of the disc 10, but is not limited to such a structure. For example, the disc transfer means can also act as the first contact member 215, so that the first contact member 215 contacts the outer non-recording area 13 of the disc 10. Substantially the same effect is provided.

In the first example, the first contact member 215 is a ring-shaped projection, but is not limited to such a structure. For example, the first contact member 215 can be an elliptical or polygonal projection or can include a plurality of contact points. Substantially the same effect is provided.

In the first example, the disc holding mechanism 120 holds the disc 10 on the turntable 110 by engaging the disc 10 and the plurality of holding claws 122, but is not limited to such a structure. For example, the disc 10 can be held on the turntable 110 by a spherical member or a ring-shaped elastic member.

In the first example, the turntable 10 is raised or lowered using the vibration alleviating member 40 also used for alleviating the vibration of the disc apparatus 1000, but is not limited to such a structure. For example, the turntable 110 can be raised or lowered using a coil spring or the like.

EXAMPLE 2

Figure 12:
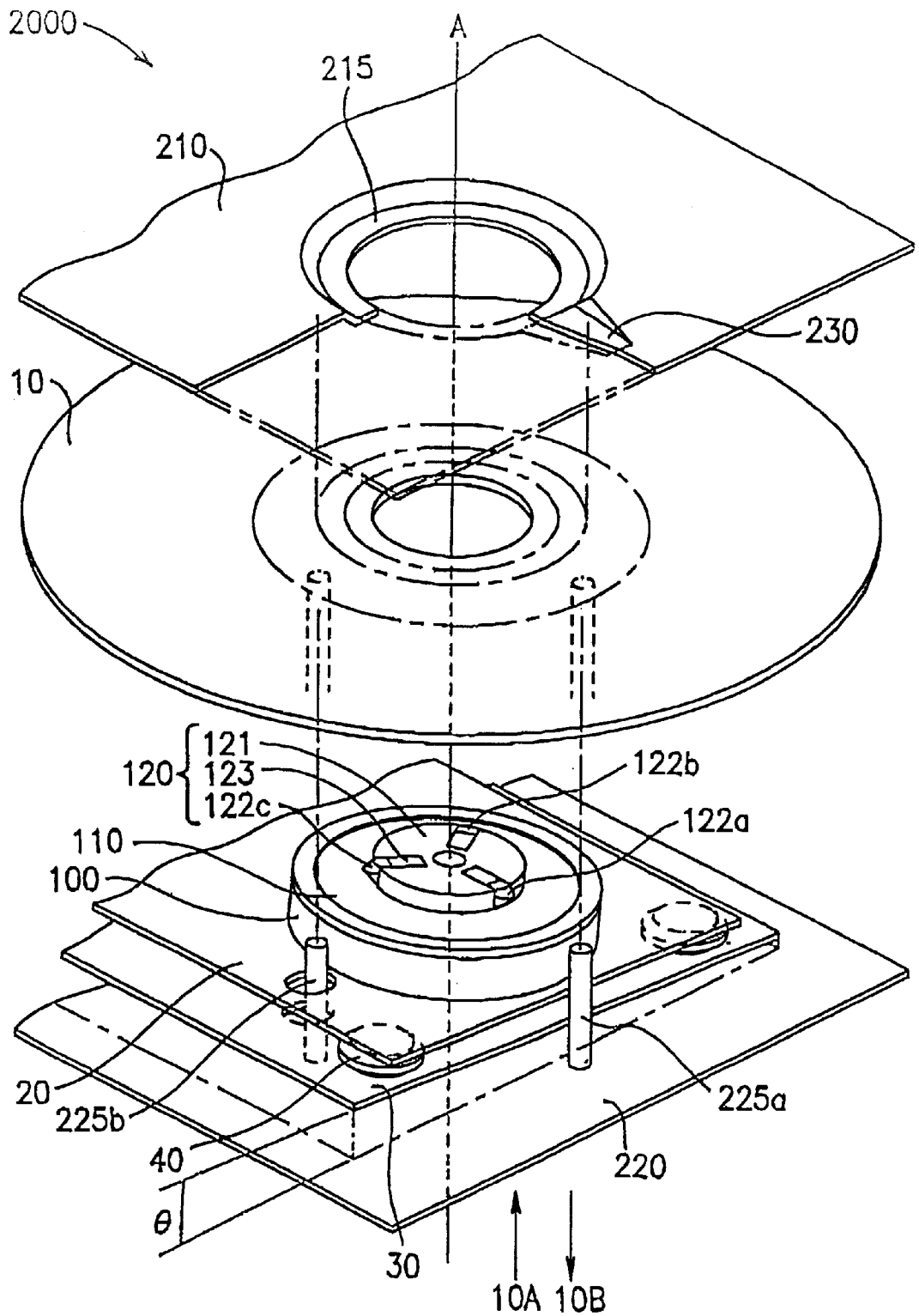
FIG. 12 is an exploded isometric view illustrating a structure of a disc apparatus according to a second example of the present invention.

FIG. 12 is an exploded isometric view illustrating a structure of a disc apparatus 2000 according to a second example of the present invention. Identical elements described with reference to FIG. 1 bear the same reference numerals therewith and will not described in detail.

The disc apparatus 2000 is mainly different from the disc apparatus 1000 shown in FIG. 1 in the following points.

(1) When the turntable 110 is raised in the direction of arrow 10A vertically with respect to the surface of the disc 10 together with the raising and lowering base 30 so as to put the disc 10 in contact with the first contact member 215, the turntable 110 (and the raising and lowering base 30) is inclined with respect to the first contact member 215 at an angle θ. (2) Two second contact members 225a and 225b are provided at an interval of 90 degrees with respect to the rotation axis A.

With reference to FIGS. 3, 6, 7, 13, 14A and 14B, an operation of the disc apparatus 2000 for mounting the disc 10 on the turntable 110 will be described. As described above, FIG. 3 shows a state before the disc 10 is mounted on the turntable 110, FIG. 6 shows a state where the disc 10 has been mounted on the turntable 110 and FIG. 7 shows a state where the disc 10 has been mounted on the turntable 110, in which the disc 10 is rotatable.

Figure 13:
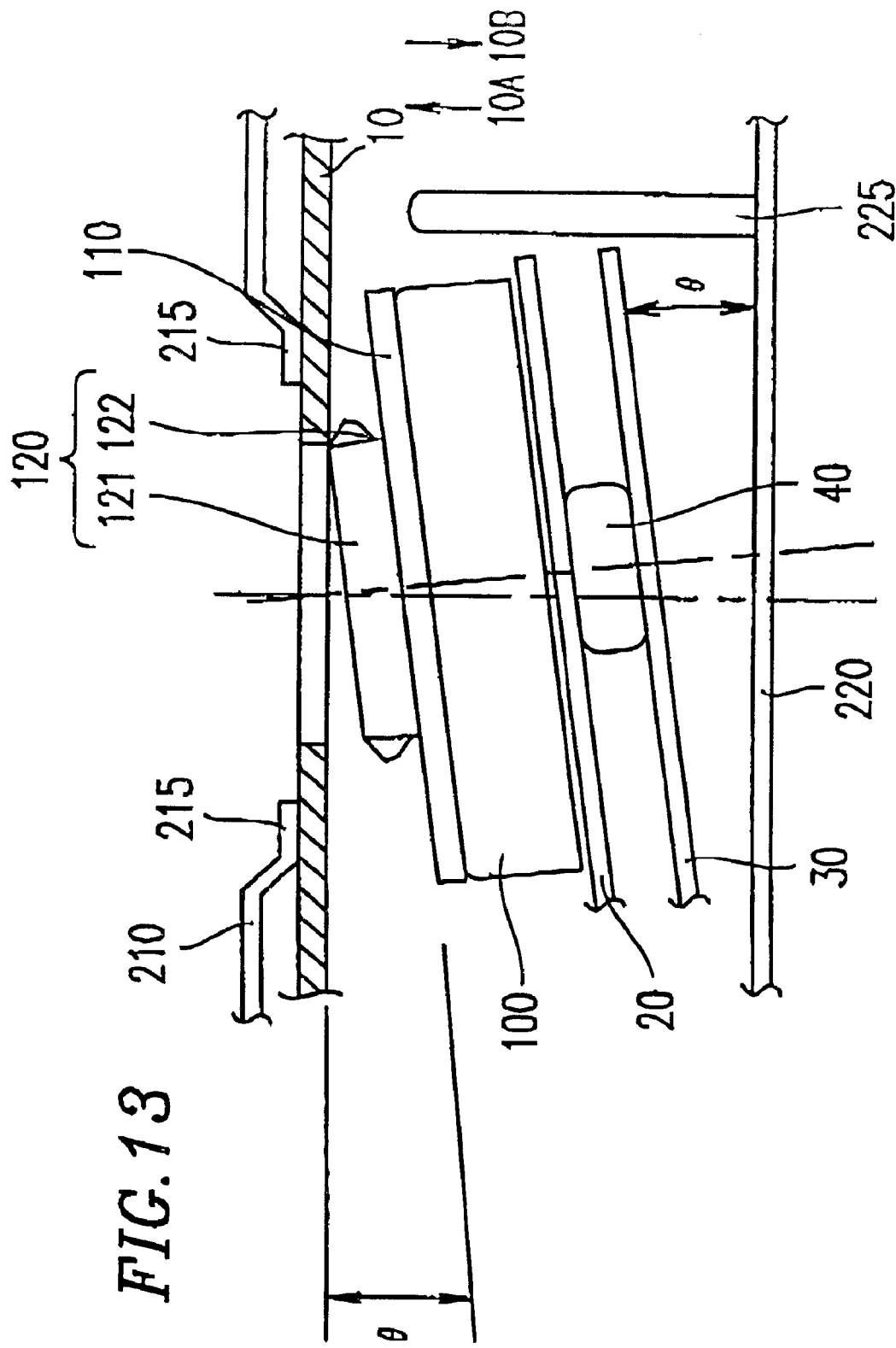
FIG. 13 shows a state of the disc apparatus shown in FIG. 12 before the disc is mounted on the turntable, in which the disc contacts the first contact member at a prescribed angle.
Figure 14A:
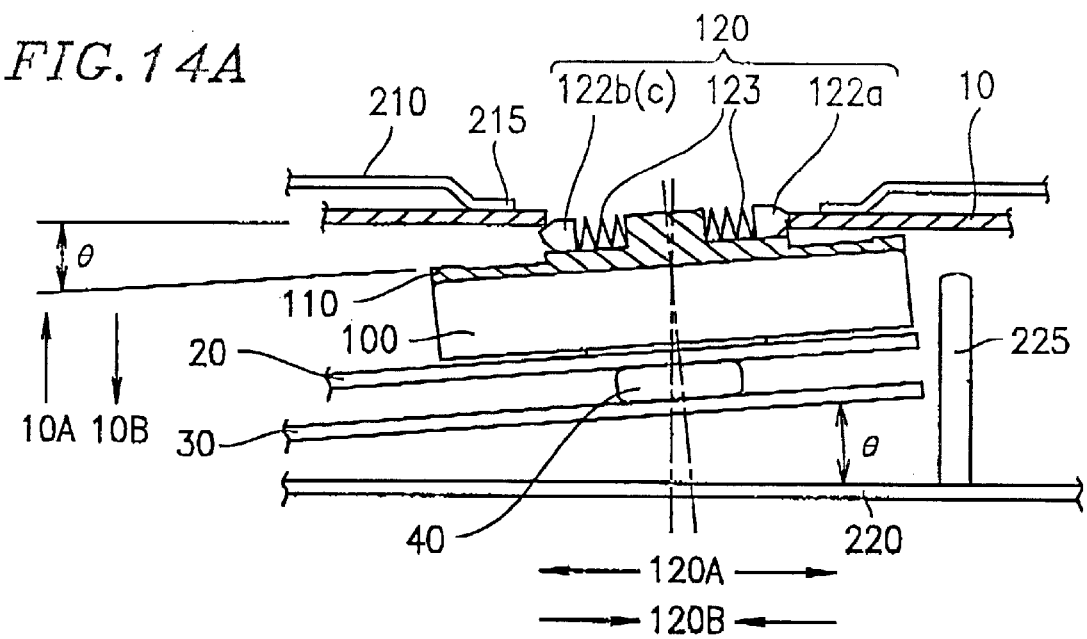
FIGS. 14A and 14B show an operation of the disc holding mechanism of the disc apparatus shown in FIG. 12 when the disc is put into contact with the first contact member at the prescribed angle.
Figure 14B:
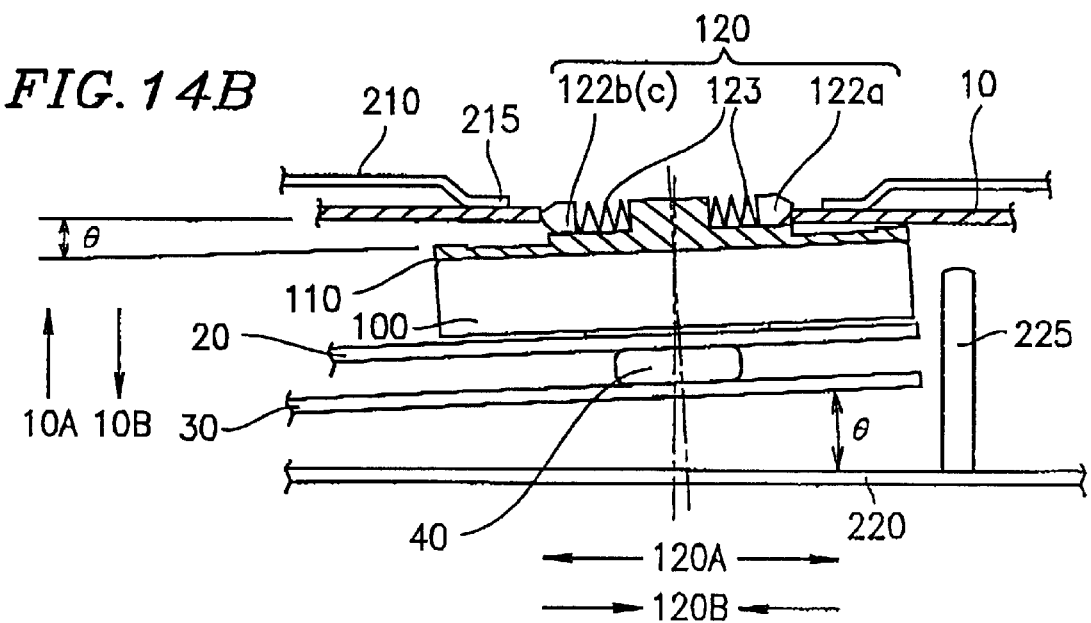

FIG. 13 shows a state before the disc 10 is mounted on the turntable 110, in which the turntable 110 is inclined with respect to the first contact member 215 at a prescribed angle θ and thus the disc 10 contacts the first contact member 215 at the prescribed angle θ. FIGS. 14A and 14B show an operation of the disc holding mechanism 120 when the disc 10 is put into contact with the first contact member 215 at the prescribed angle θ by the turntable 110. FIG. 14A shows a state when the holding claw 122a starts retracting, and FIG. 14B shows a state when the holding claw 122b, 122b starts retracting.

As shown in FIG. 3, the disc 10 is positioned above the turntable 110 after being transported by a disc transport device (not shown) as in the first example. At this point, the central line of the central hole of the disc 10 substantially matches the central line of the hub 121. From this state, the turntable 110 is raised by the moving mechanism 300 in the direction of arrow 10A in a posture of inclining with respect to the surface of the disc 10 at the prescribed angle θ. Then, the holding claw 122 (122a) of the disc holding mechanism 120 contacts the bottom surface of the disc 10. As the turntable 110 is further raised, the disc 10 in raised while being in contact with the holding claw 122. Then, as shown in FIG. 13, the top surface of the disc 10 contacts the first contact member 215.

The turntable 110 is further raised while inclining with respect to the surface of the disc 10 at the prescribed angle θ. Although the disc 10 is prevented from moving further upward in the direction of arrow 10A by the first contact member 215, the turntable 110 is further raised since the disc holding mechanism 120 passes through the central hole of the disc 10. At this point, as shown in FIG. 14A, one holding claw 122a, out of the three holding claws 122, which has already contacted the disc 10 starts retracting in the direction of arrow 120B against the loading force of the elastic member 123. The other holding claws 122b and 122c, which are still loaded by the respective elastic members 123, have not started retracting. Then, the turntable 110 is still raised while gradually reducing the inclining angle of the turntable 110. Then, as shown in FIG. 14B, the holding claw 122a completely retracts, and the holding claws 122b and 122c start retracting in the direction of arrow 120B against the loading force of the elastic members 123. Thus, after the holding claw 122a completely retracts, a force of retracting only the holding claws 122b and 122c works. In this manner, the force required for retracting the holding claws 122a, 122b and 122a is divided into a force for retracting the holding claw 122a and a force for retracting the holding claws 122b and 122c. As a result, the force required for operating the disc holding mechanism 120 is reduced.

After the above operation, the disc holding mechanism 120 passed through the central hole of the disc 10 and, as shown in FIG. 6, is raised to have the height $h_4$ from the lower casing 220. Then, the disc 10 is pressed on and mounted on the turntable 110. Even in the case where there is a size dispersion in, for example, the thickness of the disc 10 or the height of the disc apparatus 2000, the disc 10 can be mounted on the turntable 110 with certainty by the elastic deformation of the vibration alleviating member 40 as in the first example.

After the disc 10 is mounted on the turntable 110, the turntable 110 is lowered by the moving mechanism 300 to a position at which the turntable 110 does not contact the first contact member 215 or the second contact member 225. Thus, as shown in FIG. 7, the disc 10 held by the disc holding mechanism 120 is rotatable together with the turntable 110.

An described above, the turntable 110 is raised in the posture of inclining with respect to the surface of the disc 10 at a prescribed angle so as to put the disc 10 into contact with the first contact member 110. In this manner, the disc 10 can be held and mounted on the turntable 110.

In the second example, unlike the first example, the force for retracting all the holding claws 122 simultaneously against the loading force of the elastic members 123 is not required. Therefore, the force for operating the disc holding mechanism 120, i.e., the force for holding and mounting the disc 10 on the turntable 110 can be reduced. In the above description, the holding claw 122 first retracts, and then the other two holding claws retract. Alternatively, two holding claws can first retract. In this case also, the force for retracting all the holding claws is divided so as to reduce the force for operating the disc holding mechanism 120.

Next, an operation of the disc apparatus 2000 for removing the disc 10 from the turntable 110 will be described. As described above, in the second example, two second contact members 225a and 225b are provided at an interval of 90 degrees with respect to the rotation axis A. Except for this point, the operation of removing the disc 10 from the turntable 110 is similar to that of the first example.

Figure 15A:
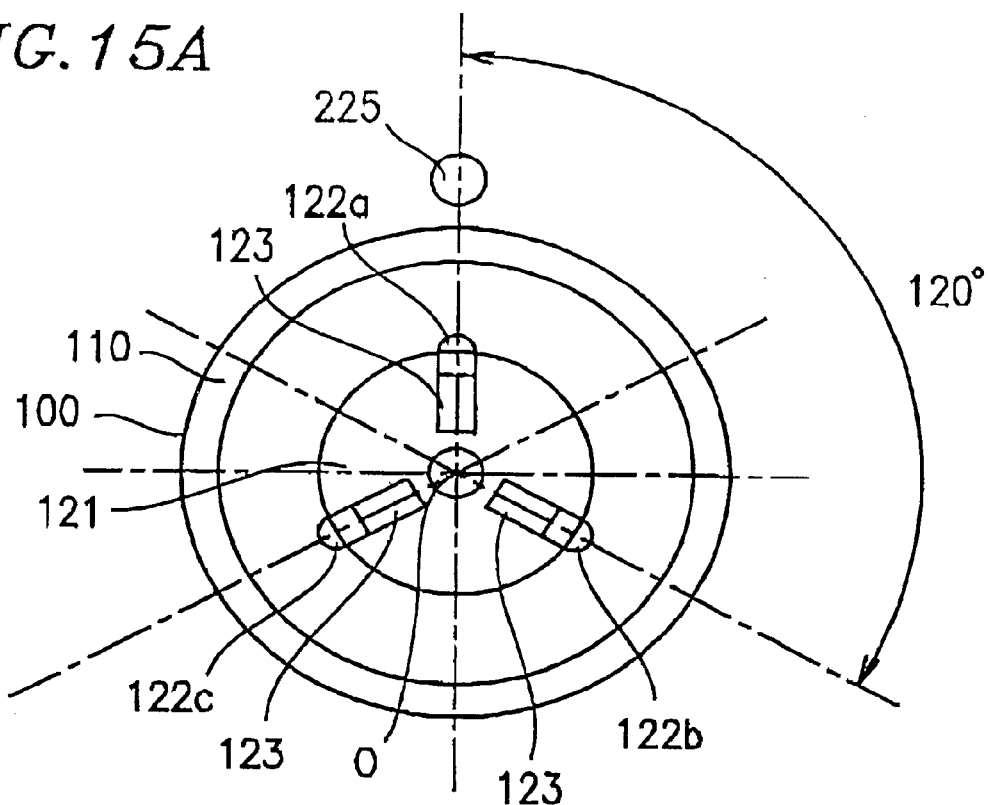
FIGS. 15A and 15B show the positional relationship between a second contact member and holding claws of the disc holding mechanism in a structure of having only one second contact member.
Figure 15B:
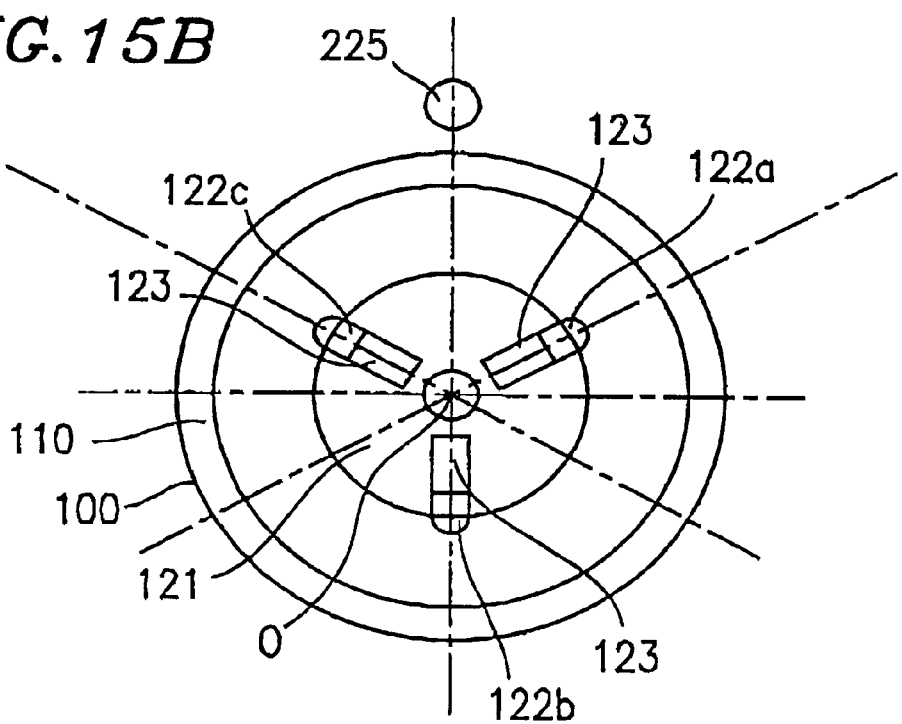

FIGS. 15A and 15B shows the positional relationship between the second contact member 225 and the three holding claws 122 (122a, 122b and 122c) in the structure of having only one second contact member 225. As shown in FIGS. 15A and 15B, the three holding claws 122a, 122b and 122a are equidistantly, i.e., at an interval of 120 degrees, provided on a circle having the rotation axis O as the center. In FIG. 15A, the position of the second contact member 225 matches the position of one of the holding claws (122a in this example) in the radial direction of the turntable 110 having a rotation axis O. In FIG. 15B, the position of none of the holding claws, 122a, 122b and 122a matches the position of the second contact member 225 in the radial direction of the turntable 110.

In the state of FIG. 15A where the position of the second contact member 225 matches the position of one of the holding claws 122 (122a in this example), the operation of removing the disc 10 from the turntable 110 is unstable as described below.

Figure 16A:
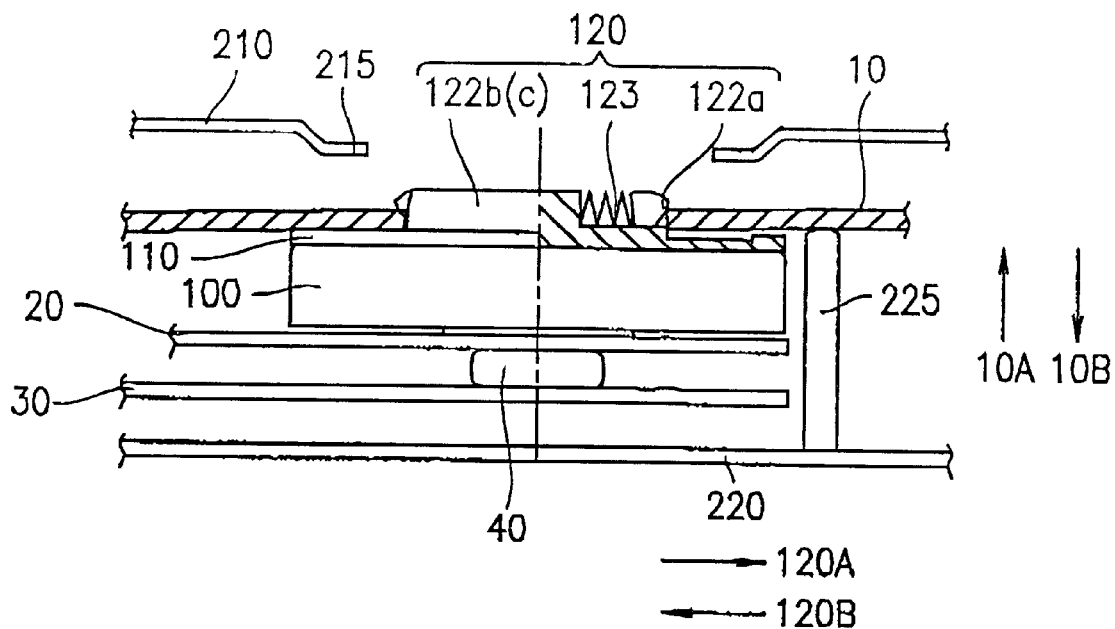
FIGS. 16A and 16B show an operation of removing the disc from the turntable in the state of FIG. 15A.
Figure 16B:
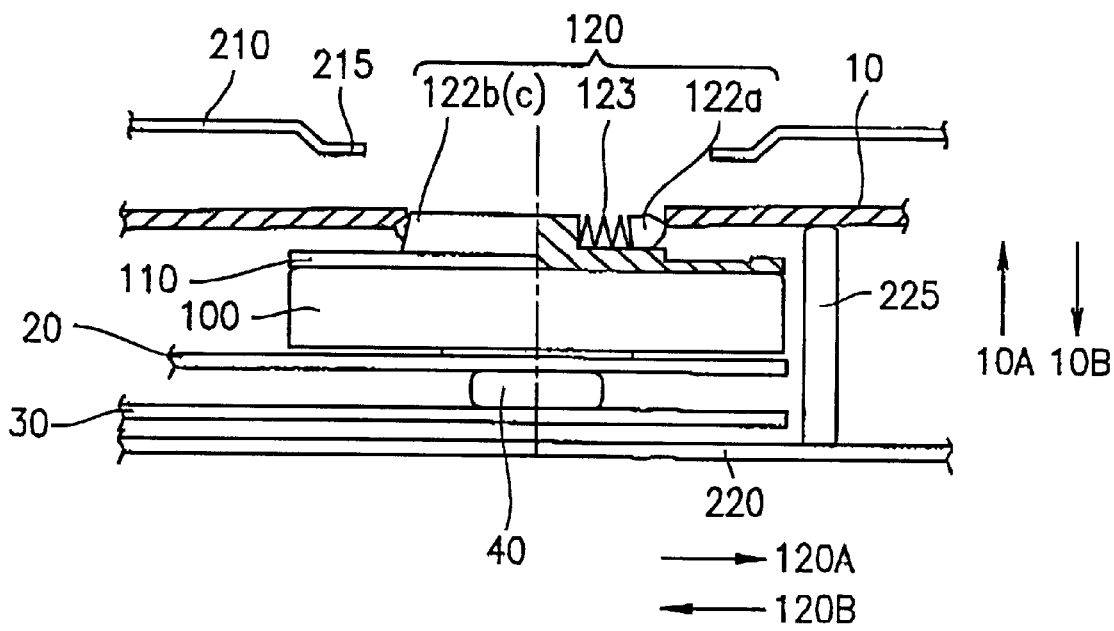

FIGS. 16A and 16B show an operation of removing the disc 10 from the turntable 110 in the state where the position of the holding claw 122a matches the position of the second contact member 225 (the state shown in FIG. 15A). In the second example, the disc 10 is removed from the turntable 110 by lowering the turntable 110 so as to relatively raise the disc 10 by the second contact member 225 as in the first example.

When the turntable 110 is lowered in the direction of arrow 10B as shown in FIG. 16A, the disc 10 is relatively raised in the direction of arrow 10A by the second contact member 225, and then the holding claw 122a starts retracting in the direction of arrow 120B against the loading force of the elastic member 123.

In the case where the position of the holding claw 122 matches the position of the second contact member 225 in the radial direction of the turntable 110, a large force for raising the holding claw 122a in the direction of arrow 10A and thus the holding claw 122a moves a significant distance in the direction of arrow 10A. As a result, the holding claw 122a may be undesirably placed on the disc 10. When the turntable 110 is lowered to a position at which the disc 10 contacts the second contact member 225 from this state (FIG. 16B), the holding claw 122a is stuck in the central hole of the disc 10 and thus the disc cannot be completely removed from the turntable 110. In such a state, the engagement of the holding claw 122a with the disc 10 prevents the transportation of the disc 10 away from the disc apparatus 2000 by the disc transport device (not shown). For this reason, in the case where the position of the second contact member 225 matches the position of one of the holding claws (e.g., 122a) in the radial direction of the turntable 110, the operation of removing the disc 10 from the turntable 110 cannot be stably performed.

Figure 17A:
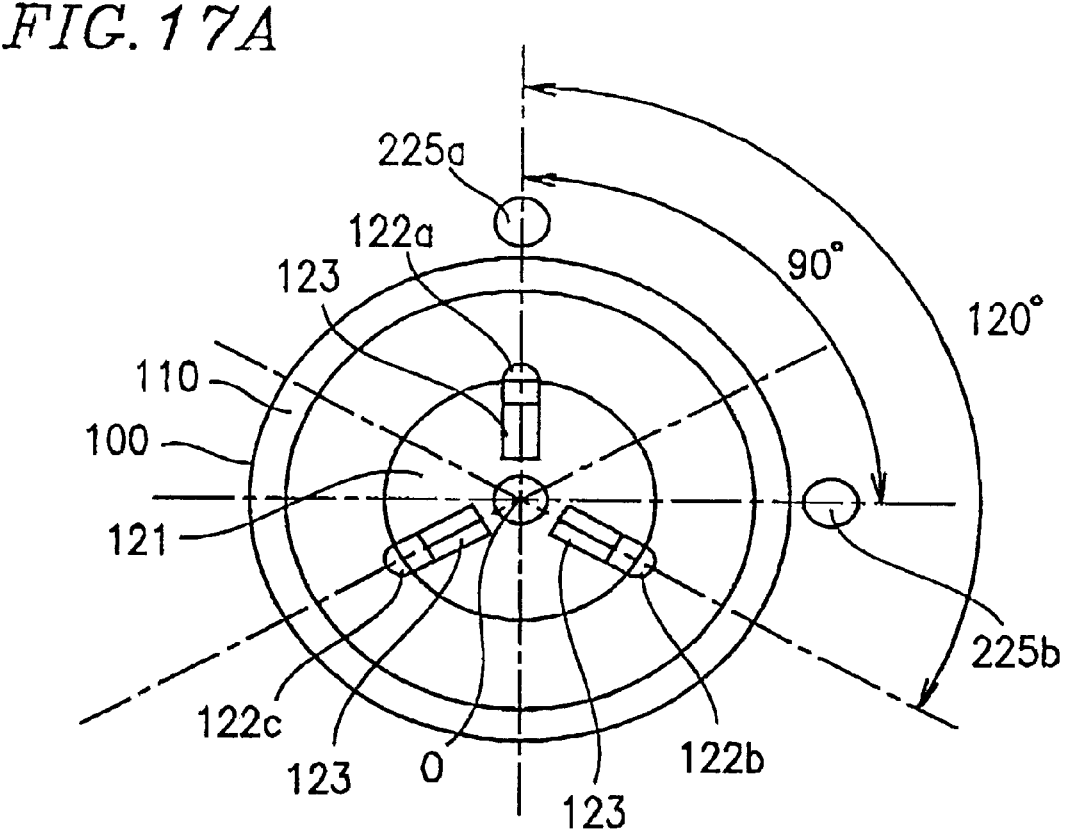
FIGS. 17A and 17B show the positional relationship between second contact members and holding claws of the disc holding mechanism, in which three holding claws are provided equidistantly, i.e. at 120 degrees with respect to the rotation axis of the turntable, and two second contact members are provided at 90 degrees with respect to the rotation axis of the turntable.
Figure 17B:
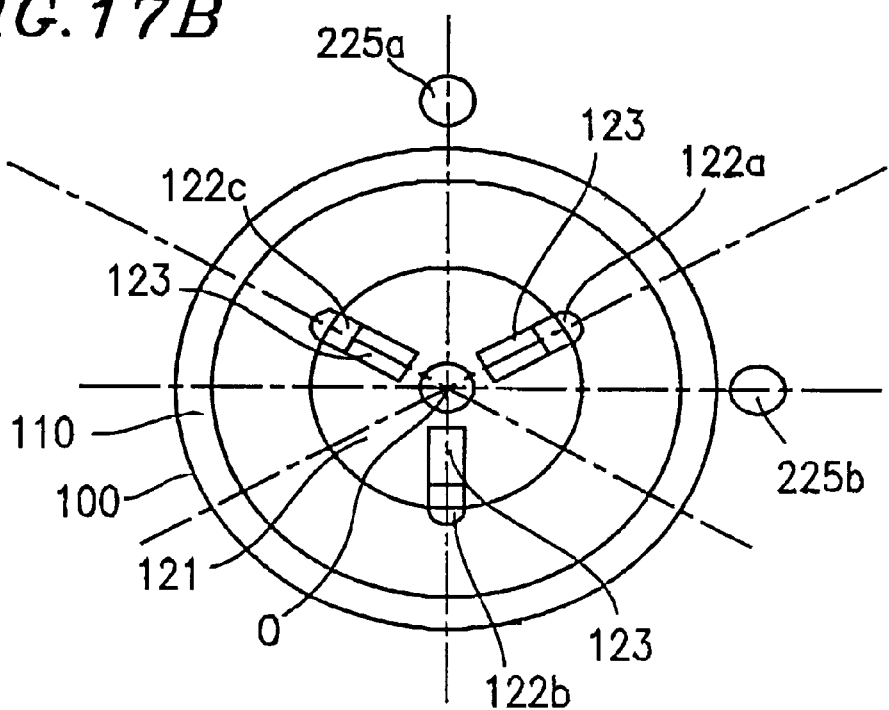

In the second example, as shown in FIGS. 17A and 17B, two second contact members 225a and 225b are provided at an interval of 90 degrees, which is different from 120 degrees at which the three holding claws 122a, 122b and 122c are provided with respect to the rotation axis O of the turntable 110. In FIG. 17A, the position of the second contact member 225a matches the position of one of the holding claws (122a in this example) in the radial direction of the turntable 110. In FIG. 17B, the position of none of the holding claws 122a, 122b and 122a matches the position of the second contact member 225 in the radial direction of the turntable 110.

Even in the state of FIG. 17A where the position of the second contact member 225a matches the position of the holding claw 122a, the position of none of the other holding claws 122b and 122a matches the position of the second contact member 225b. Therefore, the operation of removing the disc 10 from the turntable 110 can be stably performed. The positional relationship between the holding claws 122 and the second contact members 225 is not limited to the ones shown here. In the state of FIG. 17B where the position of none of the holding claws 122a, 122b and 122c matches the position of the second contact member 225, the operation of removing the disc 10 from the turntable 110 can be stably performed.

As described above, at least one of the second contact members 225 is provided at a position not matching the position of any of the holding claws 122 regardless of the stopping position of the turntable 110, the holding claws 122 are prevented from unnecessarily engaging the disc 10 during the operation of removing the disc 10 from the turntable 110. Thus, the disc 10 can be stably removed from the turntable 110.

As in the first example, the second contact member 215 can be provided at such a position as to contact the outer non-recording area of the disc 10. The second contact member 225 also acting as the disc guide member for guiding the outer non-recording area of the disc 10 can be disc transfer means such as, for example, a pin or a tray.

In the second example, the disc 10 is held on the turntable 110 by three holding claws 122. Alternatively, the disc 10 can be held on the turntable 110 by, for example, a different number of holding claws, a spherical member, or a ring-shaped elastic member.

In the second example, the first contact member 215 is provided on the upper casing 210, but is not limited to such a structure. The first contact member 215 can be a projection provided on a portion of an information device for accommodating the disc apparatus 2000, in which the first contact member 215 can operate in a manner similar to the above-described manner.

In the second example, the first contact member 215 is provided so as to be contactable with the inner non-recording area of the disc 10, but is not limited to such a structure. For example, the disc transfer means can also act as the first contact member 215, so that the first contact member 215 contacts the outer non-recording area of the disc 10. Substantially the same effect is provided.

In the second example, the first contact member 215 is a ring-shaped projection, but is not limited to such a structure. For example, the first contact member 215 can be an elliptical or polygonal projection or includes a plurality of contact points. Substantially the same effect is provided.

In the second example, the turntable 110 is raised or lowered using the vibration alleviating member 40 also used for alleviating the vibration of the disc apparatus 2000, but is not limited to such a structure. For example, the turntable 110 can be raised or lowered using a coil spring or the like.

As described above, a disc apparatus according to the present invention automatically mounts or remove a disc without using a clamper provided on the top surface of the disc for holding the disc together with the turntable below the disc.

Therefore, the number of components can be reduced and the thickness of the disc apparatus can be reduced by the thickness of the clamper.

Various other modifications, will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disc apparatus, comprising:
   a turntable having a surface on which a disc is to be placed and being rotatable around a rotation axis;
   a disc holding mechanism which can be in a first state of holding the disc on the turntable so as to be rotatable around the rotation axis and a second state which a different from the first state;
   a first contact member; and
   a moving mechanism for relatively moving the first contact member and the turntable with respect to each other in a direction generally parallel to the rotation
   wherein when the disc holding mechanism is in the second state, the moving mechanism relatively moves the turntable with respect to the first contact member so that the first contact member contacts the disc; and when the first contact member contacts the disc, the moving mechanism operates so that the first contact member applies a force on the disc in a direction of pressing the disc toward the turntable, thus placing the disc holding mechanism in the second state into the first state.

2. A disc apparatus according to claim 1, wherein the first contact member is at a fixed position, and the moving mechanism raises and lowers the turntable so as to relatively move the turntable with respect to the first contact member.

3. A disc apparatus according to claim 2, further comprising a raising and lowering base for supporting the turntable via an elastic body interposed therebetween, wherein the moving mechanism raises and lowers the turntable by raising and lowering the raising and lowering base.

4. A disc apparatus according to claim 3, the elastic body acts as a vibration alleviating member for alleviating a vibration of the disc apparatus.

5. A disc apparatus according to claim 1, wherein the moving mechanism relatively moves the turntable with respect to the first contact member so that the disc holding mechanism is in the second state at time t1, the disc holding mechanism is changed from the second state into the first state at time t4 after time t1, and the disc holding mechanism is in the first state at time t5 after time t4.

6. A disc apparatus according to claim 1, wherein the disc includes an inner area, and the first contact member contacts the inner area of the disc.

7. A disc apparatus according to claim 6, wherein the inner area is a non-recording area.

8. A disc apparatus according to claim 1, further comprising an outer casing, wherein the first contact member is a projection provided on a portion of the outer casing.

9. A disc apparatus according to claim 8, wherein the projection is ring-shaped.

10. A disc apparatus according to claim 1, wherein the first contact member is a projection provided on a portion of an information device accommodating the disc apparatus.

11. A disc apparatus according to claim 10, wherein the projection is ring-shaped.

12. A disc apparatus according to claim 1, wherein when the first contact member contacts the disc, the turntable is substantially parallel to the first contact member.

13. A disc apparatus according to claim 1, wherein when the first contact member contacts the disc, the turntable is at a prescribed angle with respect to the first contact member.

14. A disc apparatus, comprising:
   a turntable having a surface on which a disc is to be placed and being rotatable around a rotation axis;
   a disc holding mechanism which can be in a first state of holding the disc on the turntable so as to be rotatable around the rotation axis and a second state which is different from the first state;
   a second contact member; and
   a moving mechanism for relatively moving the second contact member and the turntable with respect to each other,
   wherein when the disc holding mechanism is in the first state, the moving mechanism relatively moves the turntable with respect to the second contact member so that the second contact member contacts the disc; and when the second contact member contacts the disc, the moving mechanism operates so that the second contact member applies a force on the disc in a direction of separating the disc away from the turntable, thus placing the disc holding mechanism in the first state into the second state.

15. A disc apparatus according to claim 14, wherein the second contact member is at a fixed position, and the moving mechanism raises and lowers the turntable so as to relatively move the turntable with respect to the second contact member.

16. A disc apparatus according to claim 15, further comprising an outer casing, wherein the second contact member is a projection provided on a portion of the outer casing.

17. A disc apparatus according to claim 15, further comprising a raising and lowering base for supporting the turntable via an elastic body interposed therebetween, wherein the moving mechanism raises and lowers the turntable by raising and lowering the raising and lowering base.

18. A disc apparatus according to claim 17, wherein the elastic body acts as a vibration alleviating member for alleviating a vibration of the disc apparatus.

19. A disc apparatus according to claim 14, wherein the moving mechanism relatively moves the turntable with respect to the second contact member so that the disc holding mechanism is in the first state at time t7, the disc holding mechanism is changed from the first state into the second state at time t8 after time t7, and the disc holding mechanism is in the second state at time t9 after time t8.

20. A disc apparatus according to claim 14, wherein the disc includes an inner area and an outer area, which are both non-recording areas, and the second contact member contacts one of the inner area and the outer area of the disc.

21. A disc apparatus according to claim 14, further comprising at least another second contact member, wherein the disc holding mechanism includes a plurality holding claws, and when the at least two second contact members contact the disc, the plurality of holding claws are provided around the rotation axis at an angle, which is different from the angle at which the at least two second contact members are provided around the rotation axis.

22. A disc apparatus according to claim 21, wherein the plurality of holding claws are provided equidistantly on a circle having the rotation axis as the center.

* * * * *

UNITED STATES PATENT AND TRADEMARK OFFICE
CERTIFICATE OF CORRECTION

PATENT NO. : 6,697,321 B2
DATED : February 24, 2004
INVENTOR(S) : Inata et al.

It is certified that error appears in the above-identified patent and that said Letters Patent is hereby corrected as shown below:

Title page,
Item [57], Abstract,
Line 1, after "having" insert -- a --.

Column 13,
Line 66, change "a" (second occurrence) to -- is --.

Column 14,
Line 4, after "rotation" insert -- axis; and
Line 24, after "3," insert -- wherein --.

Column 16,
Line 14, after "plurality." insert -- of --.

Signed and Sealed this

Sixth Day of July, 2004

JON W. DUDAS
*Acting Director of the United States Patent and Trademark Office*